US012786389B2

(12) United States Patent
Jeon et al.

(10) Patent No.: US 12,786,389 B2

(45) Date of Patent: Nov. 3, 2026

(54) METHOD AND APPARATUS FOR ADAPTIVE CODING OF INTRA MODE BASED ON BLOCK LOCATION

(71) Applicants: HYUNDAI MOTOR COMPANY, Seoul (KR); KIA CORPORATION, Seoul (KR); RESEARCH & BUSINESS FOUNDATION SUNGKYUNKWAN UNIVERSITY, Suwon-si (KR)

(72) Inventors: Byeung Woo Jeon, Seongnam-si (KR); Bum Yoon Kim, Yongin-si (KR); Yu Jin Lee, Suwon-si (KR); Mu Ho Cheon, Suwon-si (KR); Jin Heo, Yongin-si (KR); Seung Wook Park, Yongin-si (KR)

(73) Assignees: HYUNDAI MOTOR COMPANY, Seoul (KR); KIA CORPORATION, Seoul (KR); RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 0 days.

(21) Appl. No.: 18/862,283

(22) PCT Filed: Apr. 7, 2023

(86) PCT No.: PCT/KR2023/004719

§ 371 (c)(1),
(2) Date: Nov. 1, 2024

(87) PCT Pub. No.: WO2023/214699

PCT Pub. Date: Nov. 9, 2023

(65) Prior Publication Data

US 2025/0301128 A1 Sep. 25, 2025

(30) Foreign Application Priority Data

May 3, 2022 (KR) ........................ 10-2022-0054765
Apr. 4, 2023 (KR) ........................ 10-2023-0044007

(51) Int. Cl.
*H04N 19/11* (2014.01)
*H04N 19/176* (2014.01)
*H04N 19/70* (2014.01)

(52) U.S. Cl.
CPC ........... *H04N 19/11* (2014.11); *H04N 19/176* (2014.11); *H04N 19/70* (2014.11)

(58) Field of Classification Search
CPC ...... H04N 19/11; H04N 19/176; H04N 19/70; H04N 19/105; H04N 19/132; H04N 19/159; H04N 19/593
See application file for complete search history.

(56) References Cited

U.S. PATENT DOCUMENTS

2015/0016537 A1* 1/2015 Karczewicz ......... H04N 19/176 375/240.18
2018/0332282 A1* 11/2018 He ......................... H04N 19/11

(Continued)

FOREIGN PATENT DOCUMENTS

KR 2018-0043149 A 4/2018
KR 2021-0025539 A 3/2021

(Continued)

OTHER PUBLICATIONS

International Search Report and Written Opinion for Int. App. No. PCT/KR2023/004719, mailed Aug. 1, 2023.

*Primary Examiner* — Francis Geroleo
(74) *Attorney, Agent, or Firm* — MCDONNELL BOEHNEN HULBERT & BERGHOFF LLP

(57) ABSTRACT

A method and an apparatus are disclosed for adaptive coding of intra mode based on block position. In the disclosed embodiments, a video decoding device determines a type of the current block based on its position and generates an MPM list including MPM candidates. The video decoding device determines, among the MPM candidates and based on the type of the current block, redundant prediction modes. The video decoding device determines a representative mode among the redundant prediction modes and reorganizes the MPM list by removing redundant prediction modes other than the representative mode. The video decod- (Continued)

ing device decodes from a bitstream an MPM index of the current block and determines from a reorganized MPM list an intra-prediction mode of the current block by using the MPM index.

17 Claims, 18 Drawing Sheets

(56) References Cited

U.S. PATENT DOCUMENTS

| | | | | |
|---|---|---|---|---|
| 2020/0162729 | A1* | 5/2020 | Lee | H04N 19/46 |
| 2020/0366895 | A1 | 11/2020 | De Luxan Hernandez et al. | |
| 2021/0051334 | A1* | 2/2021 | Ahn | H04N 19/159 |
| 2022/0038691 | A1* | 2/2022 | Li | H04N 19/197 |
| 2022/0070450 | A1 | 3/2022 | Cho et al. | |
| 2022/0264089 | A1 | 8/2022 | Lim et al. | |
| 2023/0064498 | A1 | 3/2023 | Zhang et al. | |

FOREIGN PATENT DOCUMENTS

| | | | |
|---|---|---|---|
| KR | 2021-0136949 | A | 11/2021 |
| WO | 2020/091213 | A1 | 5/2020 |

* cited by examiner

| Type | Blocks By Type | Block Position |
|---|---|---|
| 1 |  | Block At Top-Left Corner |
| 2 |  | Block At Left Boundary |
| 3 |  | Block At Top Boundary |
| 4 |  | Block At Other Positions |

☐ CTU/Tile/Slice/Sub-Picture/Picture ▨ Current Block

METHOD AND APPARATUS FOR ADAPTIVE CODING OF INTRA MODE BASED ON BLOCK LOCATION

CROSS REFERENCE TO RELATED APPLICATIONS

The present application is a U.S. National Phase Application pursuant to 35 U.S.C. § 371 of International Application No. PCT/KR2023/004719 filed Apr. 7, 2023, which claims priority to Korean Patent Application No. 10-2022-0054765 filed May 3, 2022 and Korean Patent Application No. 10-2023-0044007 filed Apr. 4, 2023. The entire disclosure contents of these applications are herewith incorporated by reference into the present application.

TECHNICAL FIELD

The present disclosure relates to a video coding method and an apparatus for adaptive coding of intra mode based on a block position.

BACKGROUND

The statements in this section merely provide background information related to the present disclosure and do not necessarily constitute prior art.

Since video data has a large amount of data compared to audio or still image data, the video data requires a lot of hardware resources, including a memory, to store or transmit the video data without processing for compression.

Accordingly, an encoder is generally used to compress and store or transmit video data. A decoder receives the compressed video data, decompresses the received compressed video data, and plays the decompressed video data. Video compression techniques include H.264/Advanced Video Coding (AVC), High Efficiency Video Coding (HEVC), and Versatile Video Coding (VVC), which has improved coding efficiency by about 30% or more compared to HEVC.

However, since the image size, resolution, and frame rate gradually increase, the amount of data to be encoded also increases. Accordingly, a new compression technique providing higher coding efficiency and an improved image enhancement effect than existing compression techniques is required.

Intra prediction utilizes pixel information within the same picture to predict pixel values for the current block to be encoded. In performing intra prediction, one of multiple intra-prediction modes may be selected and used based on the features of the picture to predict the current block. An encoder selects and uses one of the intra-prediction modes to encode the current block. The encoder may then deliver information about that mode to a decoder.

HEVC technology utilizes a total of 35 intra-prediction modes for intra prediction, including 33 angular modes that have directionality and two non-angular modes that have no directionality. However, as the spatial resolution of videos increases from 720×480 to 2048×1024 or 8192×4096, the size of the prediction block accordingly increases, which needs more intra-prediction modes to be added. As illustrated in FIG. 3A, the Versatile Video Coding (VVC) technique utilizes 67 prediction modes for intra-prediction, which are further subdivided for intra-prediction, allowing for a greater variety of prediction directions than in the prior art.

Meanwhile, in performing intra prediction, the intra-prediction mode corresponding to the current block is encoded separately. At this time, the encoder encodes the intra-prediction mode as the most probable mode (MPM) or MPM remainder, which is referred to as an MPM encoding method for the intra-prediction mode. According to this method, when blocks are encoded in intra-prediction mode, the encoder uses the property that the prediction mode of neighboring blocks is similar to select six MPM candidates based on the prediction mode of current block's neighboring blocks. The six MPM candidates are collectively referred to as the MPM list. First, if the intra-prediction mode of the current block is included in the MPM list, the encoder encodes the MPM index corresponding to the intra-prediction mode of the current block among the candidates included in the MPM list. On the other hand, if the intra-prediction mode of the current block is not included in the MPM list, the encoder may encode the intra-prediction mode for the current block by using the MPM remainder that is composed with the six MPM candidates excluded.

However, if the current block is located at an image boundary (e.g., a boundary of a CTU, tile, slice, sub-picture, picture, and the like), all or some of the reference pixels located around the current block may not exist. In this case, the VVC technology uses padding to generate reference pixel values for the empty positions and then performs intra prediction as described above. In this process, inefficiency in encoding (or decoding) each of the different prediction modes may occur, even though the same predictor is often generated by using different prediction modes. Therefore, to increase video coding efficiency and enhance video quality, there is a need to provide an efficient method of encoding/decoding an intra-prediction mode.

DISCLOSURE

Technical Problem

The present disclosure seeks to provide a video coding method and an apparatus for adaptively encoding or decoding an intra-prediction mode based on the position of the current block in intra prediction.

Further, the present disclosure seeks to provide a video coding method and an apparatus for generating a Most Probable Mode list (MPM list) based on the block position, by using a predefined new method, removing redundant intra modes, or a combination of using the predefined new method and the removing of redundant intra modes to change the MPM list.

Technical Solution

At least one aspect of the present disclosure provides a method performed by a video decoding device for decoding an intra-prediction mode of a current block. The method includes determining a type of the current block based on a position of the current block. The method also includes generating a most probable mode list (MPM list) including most probable mode candidates (MPM candidates). The method also includes determining, among the MPM candidates and based on the type of the current block, redundant prediction modes that generate a common predictor. The method also includes determining a representative mode among the redundant prediction modes. The method also includes reorganizing the MPM list by removing redundant prediction modes other than the representative mode Another aspect of the present disclosure provides a method performed by a video encoding device for encoding an intra-prediction mode of a current block. The method includes determining a type of the current block based on a position of the current block. The method also includes generating a most probable mode list (MPM list) including most probable mode candidates (MPM candidates). The method also includes determining, among the MPM candidates and based on the type of the current block, redundant prediction modes that generate a common predictor. The method also includes determining a representative mode among the redundant prediction modes. The method also includes reorganizing the MPM list by removing redundant prediction modes other than the representative mode.

Yet another aspect of the present disclosure provides a computer-readable recording medium storing a bitstream generated by a video encoding method. The video encoding method includes determining a type of a current block based on a position of the current block. The video encoding method also includes generating a most probable mode list (MPM list) including most probable mode candidates (MPM candidates). The video encoding method also includes determining, among the MPM candidates and based on the type of the current block, redundant prediction modes that generate a common predictor. The video encoding method also includes determining a representative mode among the redundant prediction modes. The video encoding method also includes reorganizing the MPM list by removing redundant prediction modes other than the representative mode.

Advantageous Effects

As described above, the present disclosure provides a video coding method and an apparatus that adaptively encode or decode an intra-prediction mode according to the location of the current block. Thus, the video coding method and the apparatus increase video coding efficiency and enhance video quality.

DETAILED DESCRIPTION

Figure 1:
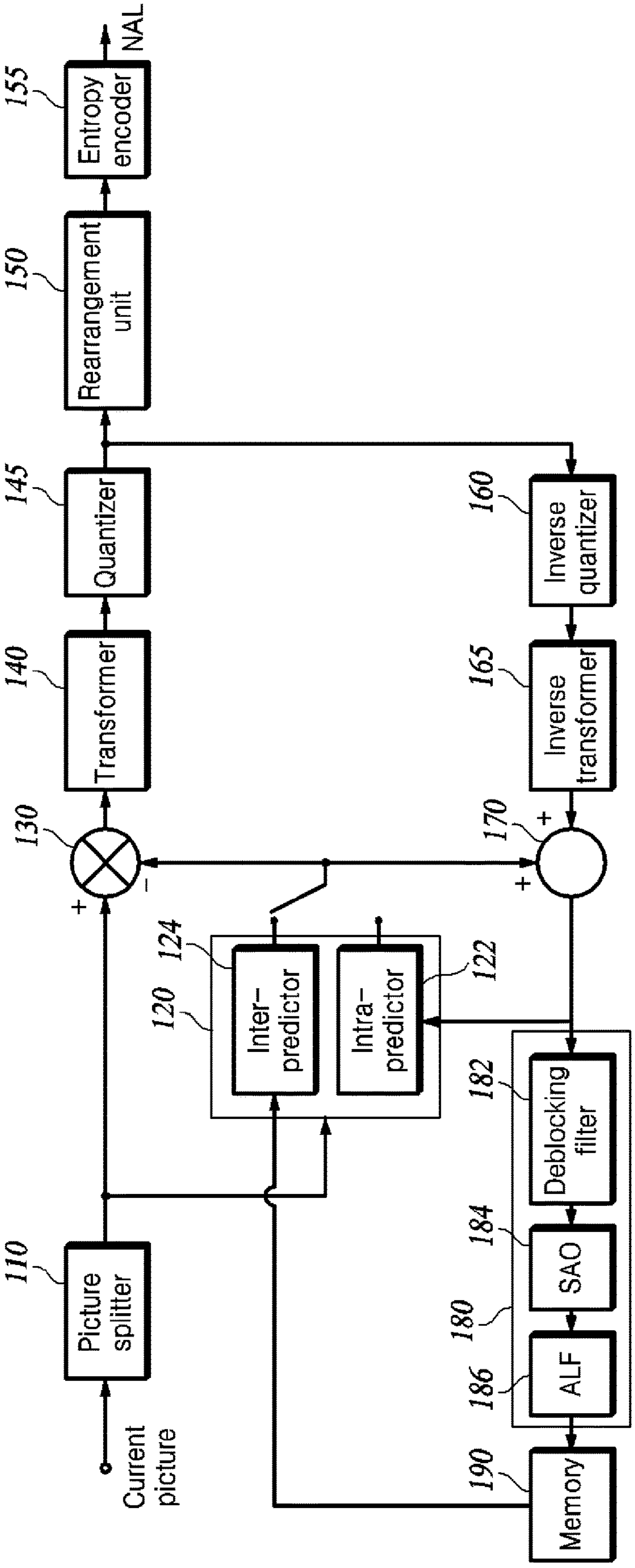
FIG. 1 is a block diagram of a video encoding apparatus that may implement the techniques of the present disclosure.

Hereinafter, some embodiments of the present disclosure are described in detail with reference to the accompanying illustrative drawings. In the following description, like reference numerals designate like elements, although the elements are shown in different drawings. Further, in the following description of some embodiments, detailed descriptions of related known components and functions when considered to obscure the subject of the present disclosure may be omitted for the purpose of clarity and for brevity.

FIG. 1 is a block diagram of a video encoding apparatus that may implement technologies of the present disclosure. Hereinafter, referring to illustration of FIG. 1, the video encoding apparatus and components of the apparatus are described.

The encoding apparatus may include a picture splitter 110, a predictor 120, a subtractor 130, a transformer 140, a quantizer 145, a rearrangement unit 150, an entropy encoder 155, an inverse quantizer 160, an inverse transformer 165, an adder 170, a loop filter unit 180, and a memory 190.

Each component of the encoding apparatus may be implemented as hardware or software or implemented as a combination of hardware and software. Further, a function of each component may be implemented as software, and a microprocessor may also be implemented to execute the function of the software corresponding to each component.

One video is constituted by one or more sequences including a plurality of pictures. Each picture is split into a plurality of areas, and encoding is performed for each area. For example, one picture is split into one or more tiles or/and slices. Here, one or more tiles may be defined as a tile group. Each tile or/and slice is split into one or more coding tree units (CTUs). In addition, each CTU is split into one or more coding units (CUs) by a tree structure. Information applied to each coding unit (CU) is encoded as a syntax of the CU, and information commonly applied to the CUs included in one CTU is encoded as the syntax of the CTU. Further, information commonly applied to all blocks in one slice is encoded as the syntax of a slice header, and information applied to all blocks constituting one or more pictures is encoded to a picture parameter set (PPS) or a picture header. Furthermore, information, which the plurality of pictures commonly refers to, is encoded to a sequence parameter set (SPS). In addition, information, which one or more SPS commonly refer to, is encoded to a video parameter set (VPS). Further, information commonly applied to one tile or tile group may also be encoded as the syntax of a tile or tile group header. The syntaxes included in the SPS, the PPS, the slice header, the tile, or the tile group header may be referred to as a high level syntax.

The picture splitter 110 determines a size of a coding tree unit (CTU). Information on the size of the CTU (CTU size) is encoded as the syntax of the SPS or the PPS and delivered to a video decoding apparatus.

The picture splitter 110 splits each picture constituting the video into a plurality of coding tree units (CTUs) having a predetermined size and then recursively splits the CTU by using a tree structure. A leaf node in the tree structure becomes the coding unit (CU), which is a basic unit of encoding.

The tree structure may be a quadtree (QT) in which a higher node (or a parent node) is split into four lower nodes (or child nodes) having the same size. The tree structure may also be a binarytree (BT) in which the higher node is split into two lower nodes. The tree structure may also be a ternarytree (TT) in which the higher node is split into three lower nodes at a ratio of 1:2:1. The tree structure may also be a structure in which two or more structures among the QT structure, the BT structure, and the TT structure are mixed. For example, a quadtree plus binarytree (QTBT) structure may be used or a quadtree plus binarytree ternarytree (QTBTTT) structure may be used. Here, a binarytree ternarytree (BTTT) is added to the tree structures to be referred to as a multiple-type tree (MTT).

Figure 2:
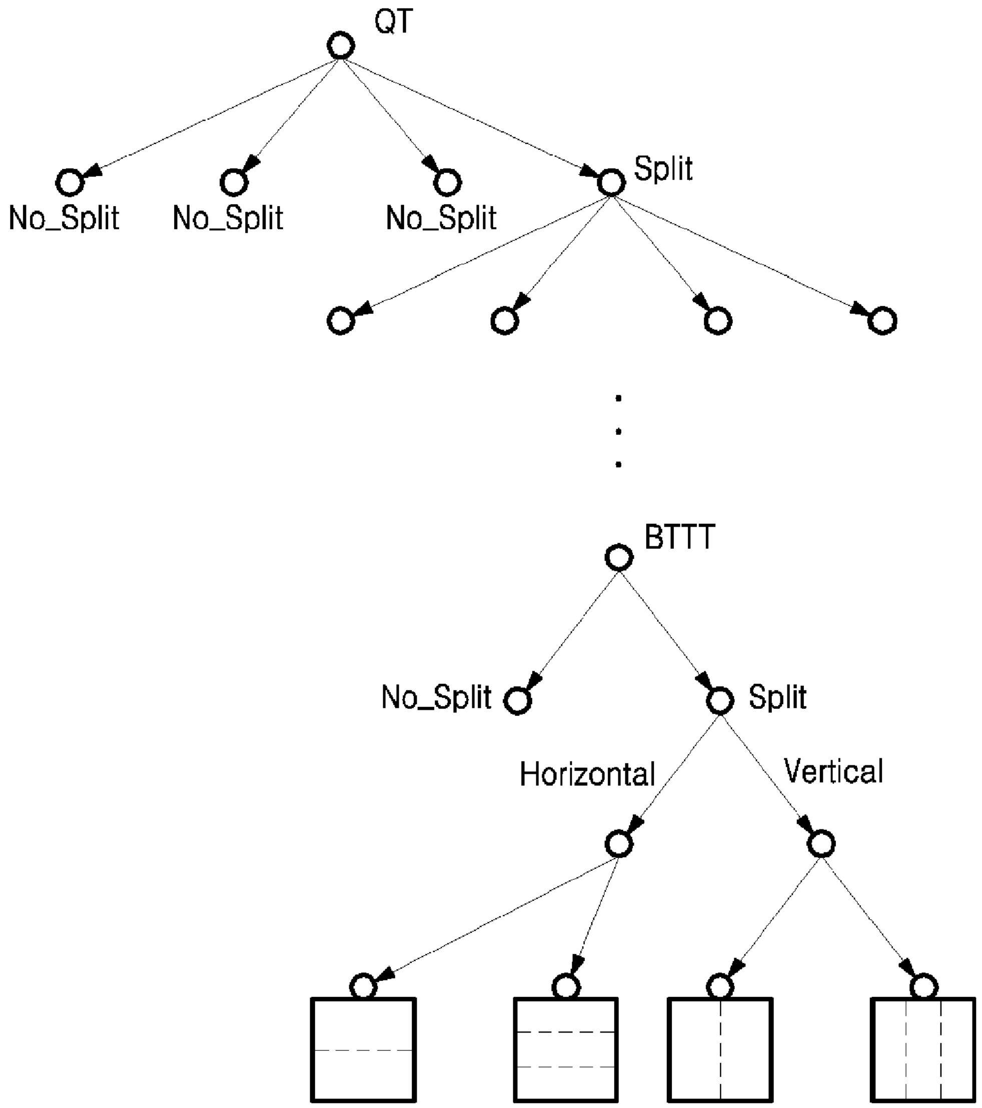
FIG. 2 illustrates a method for partitioning a block using a quadtree plus binarytree ternarytree (QTBTTT) structure.

FIG. 2 is a diagram for describing a method for splitting a block by using a QTBTTT structure.

As illustrated in FIG. 2, the CTU may first be split into the QT structure. Quadtree splitting may be recursive until the size of a splitting block reaches a minimum block size (MinQTSize) of the leaf node permitted in the QT. A first flag (QT_split_flag) indicating whether each node of the QT structure is split into four nodes of a lower layer is encoded by the entropy encoder 155 and signaled to the video decoding apparatus. When the leaf node of the QT is not larger than a maximum block size (MaxBTSize) of a root node permitted in the BT, the leaf node may be further split into at least one of the BT structure or the TT structure. A plurality of split directions may be present in the BT structure and/or the TT structure. For example, there may be two directions, i.e., a direction in which the block of the corresponding node is split horizontally and a direction in which the block of the corresponding node is split vertically. As illustrated in FIG. 2, when the MTT splitting starts, a second flag (mtt_split_flag) indicating whether the nodes are split, and a flag additionally indicating the split direction (vertical or horizontal), and/or a flag indicating a split type (binary or ternary) if the nodes are split are encoded by the entropy encoder 155 and signaled to the video decoding apparatus.

Alternatively, prior to encoding the first flag (QT_split_flag) indicating whether each node is split into four nodes of the lower layer, a CU split flag (split_cu_flag) indicating whether the node is split may also be encoded. When a value of the CU split flag (split_cu_flag) indicates that each node is not split, the block of the corresponding node becomes the leaf node in the split tree structure and becomes the CU, which is the basic unit of encoding. When the value of the CU split flag (split_cu_flag) indicates that each node is split, the video encoding apparatus starts encoding the first flag first by the above-described scheme.

When the QTBT is used as another example of the tree structure, there may be two types, i.e., a type (i.e., symmetric horizontal splitting) in which the block of the corresponding node is horizontally split into two blocks having the same size and a type (i.e., symmetric vertical splitting) in which the block of the corresponding node is vertically split into two blocks having the same size. A split flag (split_flag) indicating whether each node of the BT structure is split into the block of the lower layer and split type information indicating a splitting type are encoded by the entropy encoder 155 and delivered to the video decoding apparatus. Meanwhile, a type in which the block of the corresponding node is split into two blocks asymmetrical to each other may be additionally present. The asymmetrical form may include a form in which the block of the corresponding node is split into two rectangular blocks having a size ratio of 1:3 or may also include a form in which the block of the corresponding node is split in a diagonal direction.

The CU may have various sizes according to QTBT or QTBTTT splitting from the CTU. Hereinafter, a block corresponding to a CU (i.e., the leaf node of the QTBTTT) to be encoded or decoded is referred to as a "current block." As the QTBTTT splitting is adopted, a shape of the current block may also be a rectangular shape in addition to a square shape.

The predictor 120 predicts the current block to generate a prediction block. The predictor 120 includes an intra predictor 122 and an inter predictor 124.

In general, each of the current blocks in the picture may be predictively coded. In general, the prediction of the current block may be performed by using an intra prediction technology (using data from the picture including the current block) or an inter prediction technology (using data from a picture coded before the picture including the current block). The inter prediction includes both unidirectional prediction and bidirectional prediction.

Figure 3A:
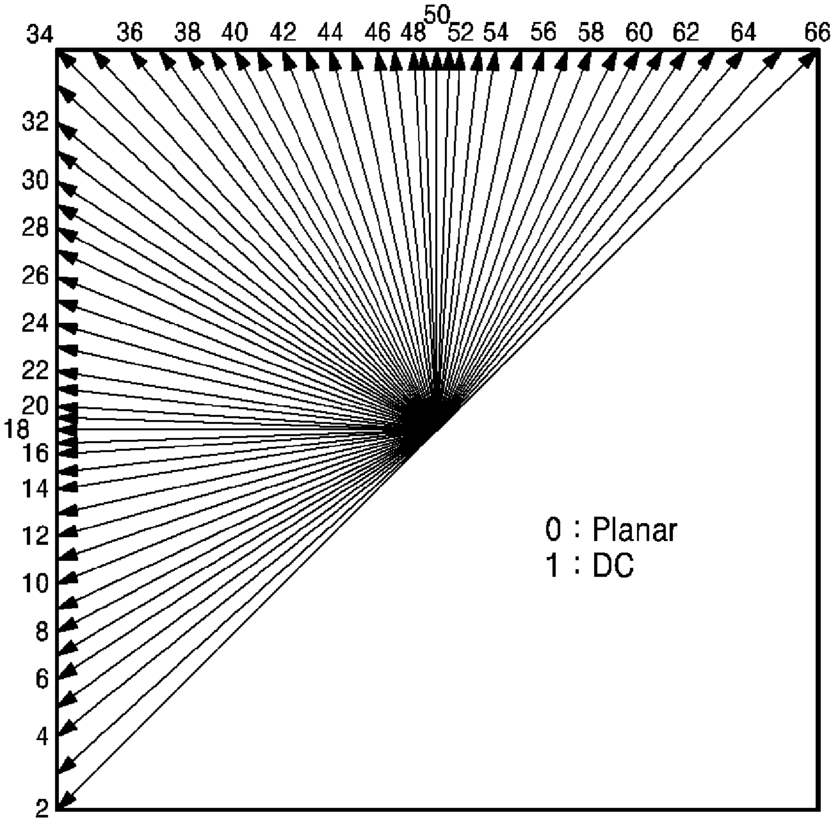
FIGS. 3A and 3B illustrate a plurality of intra prediction modes including wide-angle intra prediction modes.

The intra predictor 122 predicts pixels in the current block by using pixels (reference pixels) positioned on a neighbor of the current block in the current picture including the current block. There is a plurality of intra prediction modes according to the prediction direction. For example, as illustrated in FIG. 3A, the plurality of intra prediction modes may include 2 non-directional modes including a Planar mode and a DC mode and may include 65 directional modes. A neighboring pixel and an arithmetic equation to be used are defined differently according to each prediction mode.

Figure 3B:
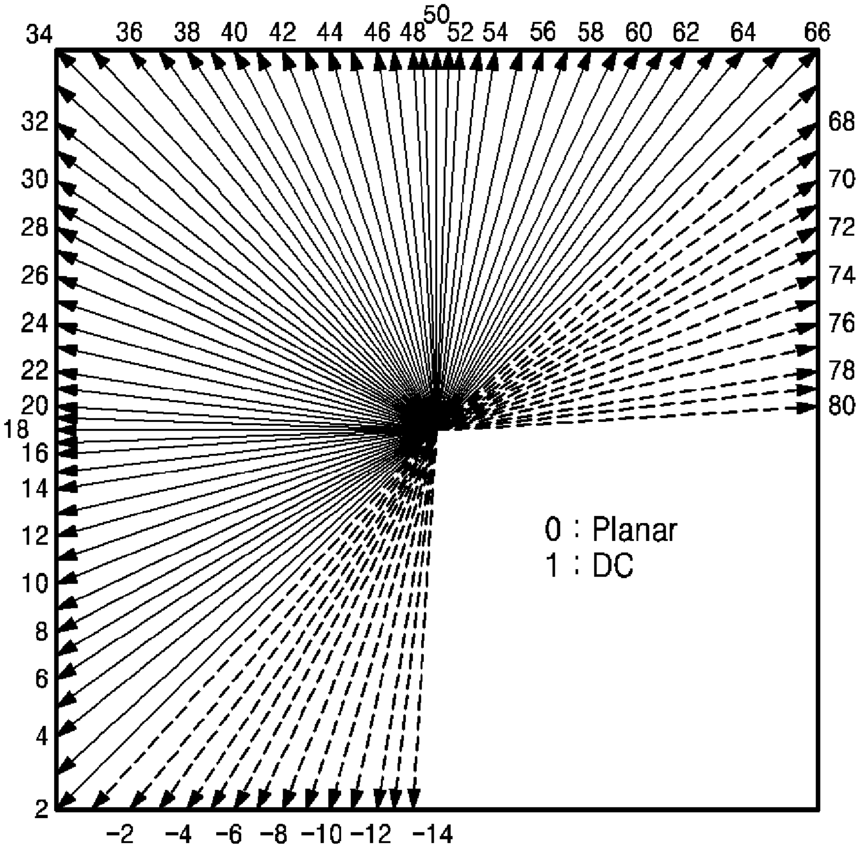

For efficient directional prediction for the current block having a rectangular shape, directional modes (#67 to #80, intra prediction modes #−1 to #−14) illustrated as dotted arrows in FIG. 3B may be additionally used. The directional modes may be referred to as "wide angle intra-prediction modes". In FIG. 3B, the arrows indicate corresponding reference samples used for the prediction and do not represent the prediction directions. The prediction direction is opposite to a direction indicated by the arrow. When the current block has the rectangular shape, the wide angle intra-prediction modes are modes in which the prediction is performed in an opposite direction to a specific directional mode without additional bit transmission. In this case, among the wide angle intra-prediction modes, some wide angle intra-prediction modes usable for the current block may be determined by a ratio of a width and a height of the current block having the rectangular shape. For example, when the current block has a rectangular shape in which the height is smaller than the width, wide angle intra-prediction modes (intra prediction modes #67 to #80) having an angle smaller than 45 degrees are usable. When the current block has a rectangular shape in which the width is larger than the height, the wide angle intra-prediction modes having an angle larger than −135 degrees are usable.

The intra predictor 122 may determine an intra prediction to be used for encoding the current block. In some examples, the intra predictor 122 may encode the current block by using multiple intra prediction modes and may also select an appropriate intra prediction mode to be used from tested modes. For example, the intra predictor 122 may calculate rate-distortion values by using a rate-distortion analysis for multiple tested intra prediction modes and may also select an intra prediction mode having best rate-distortion features among the tested modes.

The intra predictor 122 selects one intra prediction mode among a plurality of intra prediction modes and predicts the current block by using a neighboring pixel (reference pixel) and an arithmetic equation determined according to the selected intra prediction mode. Information on the selected intra prediction mode is encoded by the entropy encoder 155 and delivered to the video decoding apparatus.

The inter predictor 124 generates the prediction block for the current block by using a motion compensation process. The inter predictor 124 searches a block most similar to the current block in a reference picture encoded and decoded earlier than the current picture and generates the prediction block for the current block by using the searched block. In addition, a motion vector (MV) is generated, which corresponds to a displacement between the current block in the current picture and the prediction block in the reference picture. In general, motion estimation is performed for a luma component, and a motion vector calculated based on the luma component is used for both the luma component and a chroma component. Motion information including information on the reference picture and information on the motion vector used for predicting the current block is encoded by the entropy encoder 155 and delivered to the video decoding apparatus.

The inter predictor 124 may also perform interpolation for the reference picture or a reference block in order to increase accuracy of the prediction. In other words, sub-samples between two contiguous integer samples are interpolated by applying filter coefficients to a plurality of contiguous integer samples including two integer samples. When a process of searching a block most similar to the current block is performed for the interpolated reference picture, not integer sample unit precision but decimal unit precision may be expressed for the motion vector. Precision or resolution of the motion vector may be set differently for each target area to be encoded, e.g., a unit such as the slice, the tile, the CTU, the CU, and the like. When such an adaptive motion vector resolution (AMVR) is applied, information on the motion vector resolution to be applied to each target area should be signaled for each target area. For example, when the target area is the CU, the information on the motion vector resolution applied for each CU is signaled. The information on the motion vector resolution may be information representing precision of a motion vector difference to be described below.

Meanwhile, the inter predictor 124 may perform inter prediction by using bi-prediction. In the case of bi-prediction, two reference pictures and two motion vectors representing a block position most similar to the current block in each reference picture are used. The inter predictor 124 selects a first reference picture and a second reference picture from reference picture list 0 (RefPicList0) and reference picture list 1 (RefPicList1), respectively. The inter predictor 124 also searches blocks most similar to the current blocks in the respective reference pictures to generate a first reference block and a second reference block. In addition, the prediction block for the current block is generated by averaging or weighted-averaging the first reference block and the second reference block. In addition, motion information including information on two reference pictures used for predicting the current block and including information on two motion vectors is delivered to the entropy encoder 155. Here, reference picture list 0 may be constituted by pictures before the current picture in a display order among pre-reconstructed pictures, and reference picture list 1 may be constituted by pictures after the current picture in the display order among the pre-reconstructed pictures. However, although not particularly limited thereto, the pre-reconstructed pictures after the current picture in the display order may be additionally included in reference picture list 0. Inversely, the pre-reconstructed pictures before the current picture may also be additionally included in reference picture list 1.

In order to minimize a bit quantity consumed for encoding the motion information, various methods may be used.

For example, when the reference picture and the motion vector of the current block are the same as the reference picture and the motion vector of the neighboring block, information capable of identifying the neighboring block is encoded to deliver the motion information of the current block to the video decoding apparatus. Such a method is referred to as a merge mode.

In the merge mode, the inter predictor 124 selects a predetermined number of merge candidate blocks (hereinafter, referred to as a "merge candidate") from the neighboring blocks of the current block.

Figure 4:
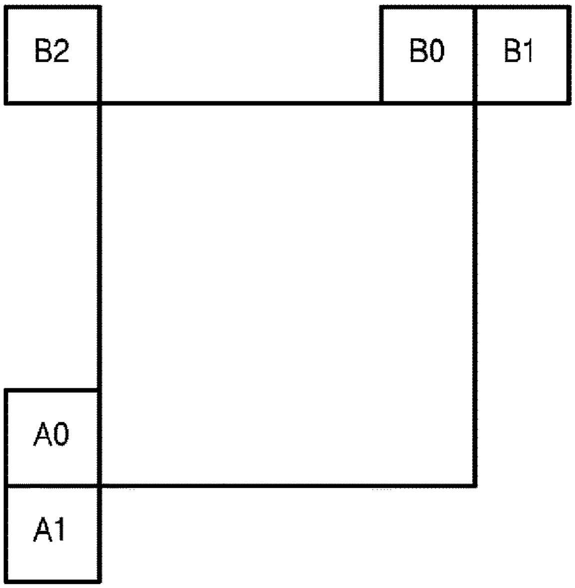
FIG. 4 illustrates neighboring blocks of a current block.

As a neighboring block for deriving the merge candidate, all or some of a left block A0, a bottom left block A1, a top block B0, a top right block B1, and a top left block B2 adjacent to the current block in the current picture may be used as illustrated in FIG. 4. Further, a block positioned within the reference picture (may be the same as or different from the reference picture used for predicting the current block) other than the current picture at which the current block is positioned may also be used as the merge candidate. For example, a co-located block with the current block within the reference picture or blocks adjacent to the co-located block may be additionally used as the merge candidate. If the number of merge candidates selected by the method described above is smaller than a preset number, a zero vector is added to the merge candidate.

The inter predictor 124 configures a merge list including a predetermined number of merge candidates by using the neighboring blocks. A merge candidate to be used as the motion information of the current block is selected from the merge candidates included in the merge list, and merge index information for identifying the selected candidate is generated. The generated merge index information is encoded by the entropy encoder 155 and delivered to the video decoding apparatus.

A merge skip mode is a special case of the merge mode. After quantization, when all transform coefficients for entropy encoding are close to zero, only the neighboring block selection information is transmitted without transmitting residual signals. By using the merge skip mode, it is possible to achieve a relatively high encoding efficiency for images with slight motion, still images, screen content images, and the like.

Hereafter, the merge mode and the merge skip mode are collectively referred to as the merge/skip mode.

Another method for encoding the motion information is an advanced motion vector prediction (AMVP) mode.

In the AMVP mode, the inter predictor 124 derives motion vector predictor candidates for the motion vector of the current block by using the neighboring blocks of the current block. As a neighboring block used for deriving the motion vector predictor candidates, all or some of a left block A0, a bottom left block A1, a top block B0, a top right block B1, and a top left block B2 adjacent to the current block in the current picture illustrated in FIG. 4 may be used. Further, a block positioned within the reference picture (may be the same as or different from the reference picture used for predicting the current block) other than the current picture at which the current block is positioned may also be used as the neighboring block used for deriving the motion vector predictor candidates. For example, a co-located block with the current block within the reference picture or blocks adjacent to the co-located block may be used. If the number of motion vector candidates selected by the method described above is smaller than a preset number, a zero vector is added to the motion vector candidate.

The inter predictor 124 derives the motion vector predictor candidates by using the motion vector of the neighboring blocks and determines motion vector predictor for the motion vector of the current block by using the motion vector predictor candidates. In addition, a motion vector difference is calculated by subtracting motion vector predictor from the motion vector of the current block.

The motion vector predictor may be acquired by applying a pre-defined function (e.g., center value and average value computation, and the like) to the motion vector predictor candidates. In this case, the video decoding apparatus also knows the pre-defined function. Further, since the neighboring block used for deriving the motion vector predictor candidate is a block in which encoding and decoding are already completed, the video decoding apparatus may also already know the motion vector of the neighboring block. Therefore, the video encoding apparatus does not need to encode information for identifying the motion vector predictor candidate. Accordingly, in this case, information on the motion vector difference and information on the reference picture used for predicting the current block are encoded.

Meanwhile, the motion vector predictor may also be determined by a scheme of selecting any one of the motion vector predictor candidates. In this case, information for identifying the selected motion vector predictor candidate is additional encoded jointly with the information on the motion vector difference and the information on the reference picture used for predicting the current block.

The subtractor 130 generates a residual block by subtracting the prediction block generated by the intra predictor 122 or the inter predictor 124 from the current block.

The transformer 140 transforms residual signals in a residual block having pixel values of a spatial domain into transform coefficients of a frequency domain. The transformer 140 may transform residual signals in the residual block by using a total size of the residual block as a transform unit or also split the residual block into a plurality of subblocks and may perform the transform by using the subblock as the transform unit. Alternatively, the residual block is divided into two subblocks, which are a transform area and a non-transform area, to transform the residual signals by using only the transform area subblock as the transform unit. Here, the transform area subblock may be one of two rectangular blocks having a size ratio of 1:1 based on a horizontal axis (or vertical axis). In this case, a flag (cu_sbt_flag) indicates that only the subblock is transformed, and directional (vertical/horizontal) information (cu_sbt_horizontal_flag) and/or positional information (cu_sbt_pos_flag) are encoded by the entropy encoder 155 and signaled to the video decoding apparatus. Further, a size of the transform area subblock may have a size ratio of 1:3 based on the horizontal axis (or vertical axis). In this case, a flag (cu_sbt_quad_flag) dividing the corresponding splitting is additionally encoded by the entropy encoder 155 and signaled to the video decoding apparatus.

Meanwhile, the transformer 140 may perform the transform for the residual block individually in a horizontal direction and a vertical direction. For the transform, various types of transform functions or transform matrices may be used. For example, a pair of transform functions for horizontal transform and vertical transform may be defined as a multiple transform set (MTS). The transformer 140 may select one transform function pair having highest transform efficiency in the MTS and may transform the residual block in each of the horizontal and vertical directions. Information (mts_idx) on the transform function pair in the MTS is encoded by the entropy encoder 155 and signaled to the video decoding apparatus.

The quantizer 145 quantizes the transform coefficients output from the transformer 140 using a quantization parameter and outputs the quantized transform coefficients to the entropy encoder 155. The quantizer 145 may also immediately quantize the related residual block without the transform for any block or frame. The quantizer 145 may also apply different quantization coefficients (scaling values) according to positions of the transform coefficients in the transform block. A quantization matrix applied to quantized transform coefficients arranged in 2 dimensional may be encoded and signaled to the video decoding apparatus.

The rearrangement unit 150 may perform realignment of coefficient values for quantized residual values.

The rearrangement unit 150 may change a 2D coefficient array to a 1D coefficient sequence by using coefficient scanning. For example, the rearrangement unit 150 may output the 1D coefficient sequence by scanning a DC coefficient to a high-frequency domain coefficient by using a zig-zag scan or a diagonal scan. According to the size of the transform unit and the intra prediction mode, vertical scan of scanning a 2D coefficient array in a column direction and horizontal scan of scanning a 2D block type coefficient in a row direction may also be used instead of the zig-zag scan. In other words, according to the size of the transform unit and the intra prediction mode, a scan method to be used may be determined among the zig-zag scan, the diagonal scan, the vertical scan, and the horizontal scan.

The entropy encoder 155 generates a bitstream by encoding a sequence of 1D quantized transform coefficients output from the rearrangement unit 150 by using various encoding schemes including a Context-based Adaptive Binary Arithmetic Code (CABAC), an Exponential Golomb, or the like.

Further, the entropy encoder 155 encodes information, such as a CTU size, a CTU split flag, a QT split flag, an MTT split type, an MTT split direction, etc., related to the block splitting to allow the video decoding apparatus to split the block equally to the video encoding apparatus. Further, the entropy encoder 155 encodes information on a prediction type indicating whether the current block is encoded by intra prediction or inter prediction. The entropy encoder 155 encodes intra prediction information (i.e., information on an intra prediction mode) or inter prediction information (in the case of the merge mode, a merge index and in the case of the AMVP mode, information on the reference picture index and the motion vector difference) according to the prediction type. Further, the entropy encoder 155 encodes information related to quantization, i.e., information on the quantization parameter and information on the quantization matrix.

The inverse quantizer 160 dequantizes the quantized transform coefficients output from the quantizer 145 to generate the transform coefficients. The inverse transformer 165 transforms the transform coefficients output from the inverse quantizer 160 into a spatial domain from a frequency domain to reconstruct the residual block.

The adder 170 adds the reconstructed residual block and the prediction block generated by the predictor 120 to reconstruct the current block. Pixels in the reconstructed current block may be used as reference pixels when intra-predicting a next-order block.

The loop filter unit 180 performs filtering for the reconstructed pixels in order to reduce blocking artifacts, ringing artifacts, blurring artifacts, etc., which occur due to block based prediction and transform/quantization. The loop filter unit 180 as an in-loop filter may include all or some of a deblocking filter 182, a sample adaptive offset (SAO) filter 184, and an adaptive loop filter (ALF) 186.

The deblocking filter 182 filters a boundary between the reconstructed blocks in order to remove a blocking artifact, which occurs due to block unit encoding/decoding, and the SAO filter 184 and the ALF 186 perform additional filtering for a deblocked filtered video. The SAO filter 184 and the ALF 186 are filters used for compensating differences between the reconstructed pixels and original pixels, which occur due to lossy coding. The SAO filter 184 applies an offset as a CTU unit to enhance a subjective image quality and encoding efficiency. On the other hand, the ALF 186 performs block unit filtering and compensates distortion by applying different filters by dividing a boundary of the corresponding block and a degree of a change amount. Information on filter coefficients to be used for the ALF may be encoded and signaled to the video decoding apparatus.

The reconstructed block filtered through the deblocking filter 182, the SAO filter 184, and the ALF 186 is stored in the memory 190. When all blocks in one picture are reconstructed, the reconstructed picture may be used as a reference picture for inter predicting a block within a picture to be encoded afterwards.

Figure 5:
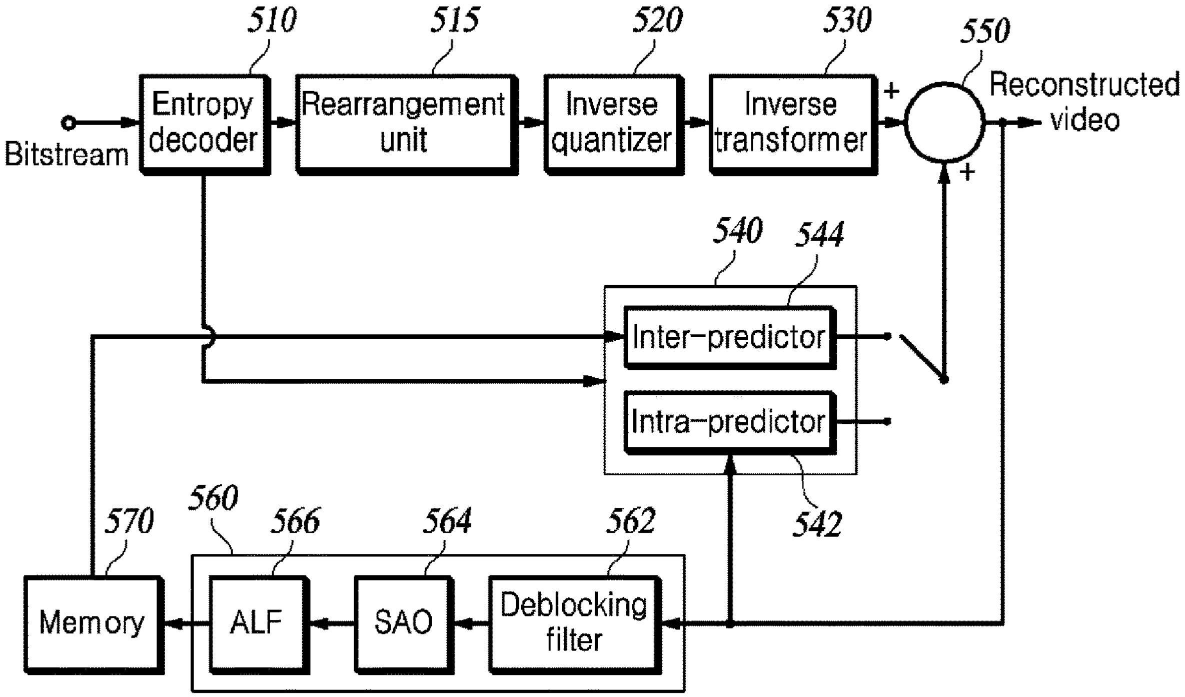
FIG. 5 is a block diagram of a video decoding apparatus that may implement the techniques of the present disclosure.

FIG. 5 is a functional block diagram of a video decoding apparatus that may implement the technologies of the present disclosure. Hereinafter, referring to FIG. 5, the video decoding apparatus and components of the apparatus are described.

The video decoding apparatus may include an entropy decoder 510, a rearrangement unit 515, an inverse quantizer 520, an inverse transformer 530, a predictor 540, an adder 550, a loop filter unit 560, and a memory 570.

Similar to the video encoding apparatus of FIG. 1, each component of the video decoding apparatus may be implemented as hardware or software or implemented as a combination of hardware and software. Further, a function of each component may be implemented as the software, and a microprocessor may also be implemented to execute the function of the software corresponding to each component.

The entropy decoder 510 extracts information related to block splitting by decoding the bitstream generated by the video encoding apparatus to determine a current block to be decoded and extracts prediction information required for reconstructing the current block and information on the residual signals.

The entropy decoder 510 determines the size of the CTU by extracting information on the CTU size from a sequence parameter set (SPS) or a picture parameter set (PPS) and splits the picture into CTUs having the determined size. In addition, the CTU is determined as a highest layer of the tree structure, i.e., a root node, and split information for the CTU may be extracted to split the CTU by using the tree structure.

For example, when the CTU is split by using the QTBTTT structure, a first flag (QT_split_flag) related to splitting of the QT is first extracted to split each node into four nodes of the lower layer. In addition, a second flag (mtt_split_flag), a split direction (vertical/horizontal), and/or a split type (binary/ternary) related to splitting of the MTT are extracted with respect to the node corresponding to the leaf node of the QT to split the corresponding leaf node into an MTT structure. As a result, each of the nodes below the leaf node of the QT is recursively split into the BT or TT structure.

As another example, when the CTU is split by using the QTBTTT structure, a CU split flag (split_cu_flag) indicating whether the CU is split is extracted. When the corresponding block is split, the first flag (QT_split_flag) may also be extracted. During a splitting process, with respect to each node, recursive MTT splitting of 0 times or more may occur after recursive QT splitting of 0 times or more. For example, with respect to the CTU, the MTT splitting may immediately occur, or on the contrary, only QT splitting of multiple times may also occur.

As another example, when the CTU is split by using the QTBT structure, the first flag (QT_split_flag) related to the splitting of the QT is extracted to split each node into four nodes of the lower layer. In addition, a split flag (split_flag) indicating whether the node corresponding to the leaf node of the QT is further split into the BT, and split direction information are extracted.

Meanwhile, when the entropy decoder 510 determines a current block to be decoded by using the splitting of the tree structure, the entropy decoder 510 extracts information on a prediction type indicating whether the current block is intra predicted or inter predicted. When the prediction type information indicates the intra prediction, the entropy decoder 510 extracts a syntax element for intra prediction information (intra prediction mode) of the current block. When the prediction type information indicates the inter prediction, the entropy decoder 510 extracts information representing a syntax element for inter prediction information, i.e., a motion vector and a reference picture to which the motion vector refers.

Further, the entropy decoder 510 extracts quantization related information and extracts information on the quantized transform coefficients of the current block as the information on the residual signals.

The rearrangement unit 515 may change a sequence of 1D quantized transform coefficients entropy-decoded by the entropy decoder 510 to a 2D coefficient array (i.e., block) again in a reverse order to the coefficient scanning order performed by the video encoding apparatus.

The inverse quantizer 520 dequantizes the quantized transform coefficients and dequantizes the quantized transform coefficients by using the quantization parameter. The inverse quantizer 520 may also apply different quantization coefficients (scaling values) to the quantized transform coefficients arranged in 2D. The inverse quantizer 520 may perform dequantization by applying a matrix of the quantization coefficients (scaling values) from the video encoding apparatus to a 2D array of the quantized transform coefficients.

The inverse transformer 530 generates the residual block for the current block by reconstructing the residual signals by inversely transforming the dequantized transform coefficients into the spatial domain from the frequency domain.

Further, when the inverse transformer 530 inversely transforms a partial area (subblock) of the transform block, the inverse transformer 530 extracts a flag (cu_sbt_flag) that only the subblock of the transform block is transformed, directional (vertical/horizontal) information (cu_sbt_horizontal_flag) of the subblock, and/or positional information (cu_sbt_pos_flag) of the subblock. The inverse transformer 530 also inversely transforms the transform coefficients of the corresponding subblock into the spatial domain from the frequency domain to reconstruct the residual signals and fills an area, which is not inversely transformed, with a value of "0" as the residual signals to generate a final residual block for the current block.

Further, when the MTS is applied, the inverse transformer 530 determines the transform index or the transform matrix to be applied in each of the horizontal and vertical directions by using the MTS information (mts_idx) signaled from the video encoding apparatus. The inverse transformer 530 also performs inverse transform for the transform coefficients in the transform block in the horizontal and vertical directions by using the determined transform function.

The predictor 540 may include an intra predictor 542 and an inter predictor 544. The intra predictor 542 is activated when the prediction type of the current block is the intra prediction, and the inter predictor 544 is activated when the prediction type of the current block is the inter prediction.

The intra predictor 542 determines the intra prediction mode of the current block among the plurality of intra prediction modes from the syntax element for the intra prediction mode extracted from the entropy decoder 510. The intra predictor 542 also predicts the current block by using neighboring reference pixels of the current block according to the intra prediction mode.

The inter predictor 544 determines the motion vector of the current block and the reference picture to which the motion vector refers by using the syntax element for the inter prediction mode extracted from the entropy decoder 510.

The adder 550 reconstructs the current block by adding the residual block output from the inverse transformer 530 and the prediction block output from the inter predictor 544 or the intra predictor 542. Pixels within the reconstructed current block are used as a reference pixel upon intra predicting a block to be decoded afterwards.

The loop filter unit 560 as an in-loop filter may include a deblocking filter 562, an SAO filter 564, and an ALF 566. The deblocking filter 562 performs deblocking filtering a boundary between the reconstructed blocks in order to remove the blocking artifact, which occurs due to block unit decoding. The SAO filter 564 and the ALF 566 perform additional filtering for the reconstructed block after the deblocking filtering in order to compensate differences between the reconstructed pixels and original pixels, which occur due to lossy coding. The filter coefficients of the ALF are determined by using information on filter coefficients decoded from the bitstream.

The reconstructed block filtered through the deblocking filter 562, the SAO filter 564, and the ALF 566 is stored in the memory 570. When all blocks in one picture are reconstructed, the reconstructed picture may be used as a reference picture for inter predicting a block within a picture to be encoded afterwards.

The present disclosure in some embodiments relates to encoding and decoding video images as described above. More specifically, the present disclosure provides a video coding method and an apparatus that adaptively encode or decode an intra-prediction mode based on a position of the current block in intra prediction of the current block. Further, the present disclosure provides a video coding method and an apparatus for generating a Most Probable Mode (MPM) list based on the position of a block, and for changing the MPM list by using a predefined new method, removing redundant intra modes, or a combination of using the predefined new method and removing the redundant intra modes.

The following embodiments may be performed by the intra predictor 122 in the video encoding device. The following embodiments may also be performed by the intra predictor 542 in the video decoding device.

The video encoding device in the prediction of the current block may generate signaling information associated with the present embodiments in terms of optimizing rate distortion. The video encoding device may use the entropy encoder 155 to encode the signaling information and transmit the encoded signaling information to the video decoding device. The video decoding device may use the entropy decoder 510 to decode, from the bitstream, the signaling information associated with the prediction of the current block.

In the following description, the term "target block" may be used interchangeably with the current block or coding unit (CU), or may refer to some area of a coding unit.

Further, the value of one flag being true indicates when the flag is set to 1. Additionally, the value of one flag being false indicates when the flag is set to 0.

I-1. Reference Pixel Padding

Intra prediction generates a predictor by referencing adjacent pixels of the current block. The neighboring pixels to be referenced are called reference samples. Before performing intra prediction, the video decoding device prepares the reference samples. The video decoding device checks the availability of reference samples for the locations of the pixels to be referenced. If no reference sample is present, the pixel value according to the predetermined agreement between the video encoding device and the video decoding device is padded to the locations of the pixels to be referenced. Then, by applying a filter to the prepared reference samples, final reference samples may be generated.

In this case, the reference samples refUnfilt[x][y] before applying the filter may be generated as follows. Hereinafter, refIdx denotes the index of the reference line, and refW and refH denote the width and height of the reference region, respectively.

If all samples in refUnfilt[x][y] are unavailable for intra prediction, then all values of refUnfilt[x][y] are set to 1<<(BitDepth−1). Here, x=−1−refIdx, y=−1−refIdx . . . refH−1, and x=−refIdx . . . refW−1, y=−1−refIdx.

On the other hand, if some refUnfilt[x][y] values are unavailable for intra prediction, the following method is applied.

If refUnfilt[−1−refIdx][refH−1] is unavailable, the available refUnfilt[x][y] is searched for by searching from 'x=−1−refIdx, y=refH−1' to 'x=−1−refIdx, y=−1−refIdx', and then from 'x=−refIdx, y=−1−refIdx' to 'x=refW−1, y=−1−refIdx'. After terminating the search, refUnfilt[−1−refIdx][refH−1] is set to refUnfilt[x][y].

Further, if there are unavailable samples in the range of x=−1−refIdx, y=refH−2 . . . 1−refIdx, then refUnfilt[x][y] is set to refUnfilt[x][y+1].

Additionally, if there are unavailable samples in the range of x=−refIdx . . . refW−1, y=−1−refIdx, then refUnfilt[x][y] is set to refUnfilt[x−1][y].

Figure 6:
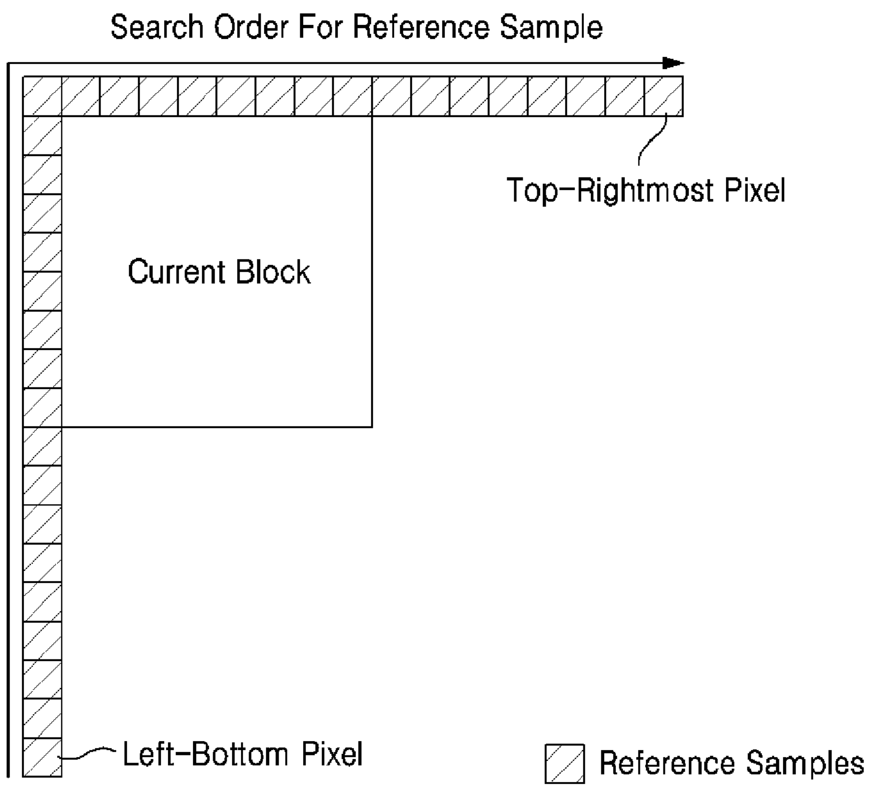
FIG. 6 is a diagram illustrating a search order of reference samples.

FIG. 6 is a diagram illustrating a search order of reference samples.

To check the availability of the reference sample, the video decoding device searches clockwise from the bottom-left pixel to the top-rightmost pixel, as shown in the example of FIG. 6.

Figure 7A:
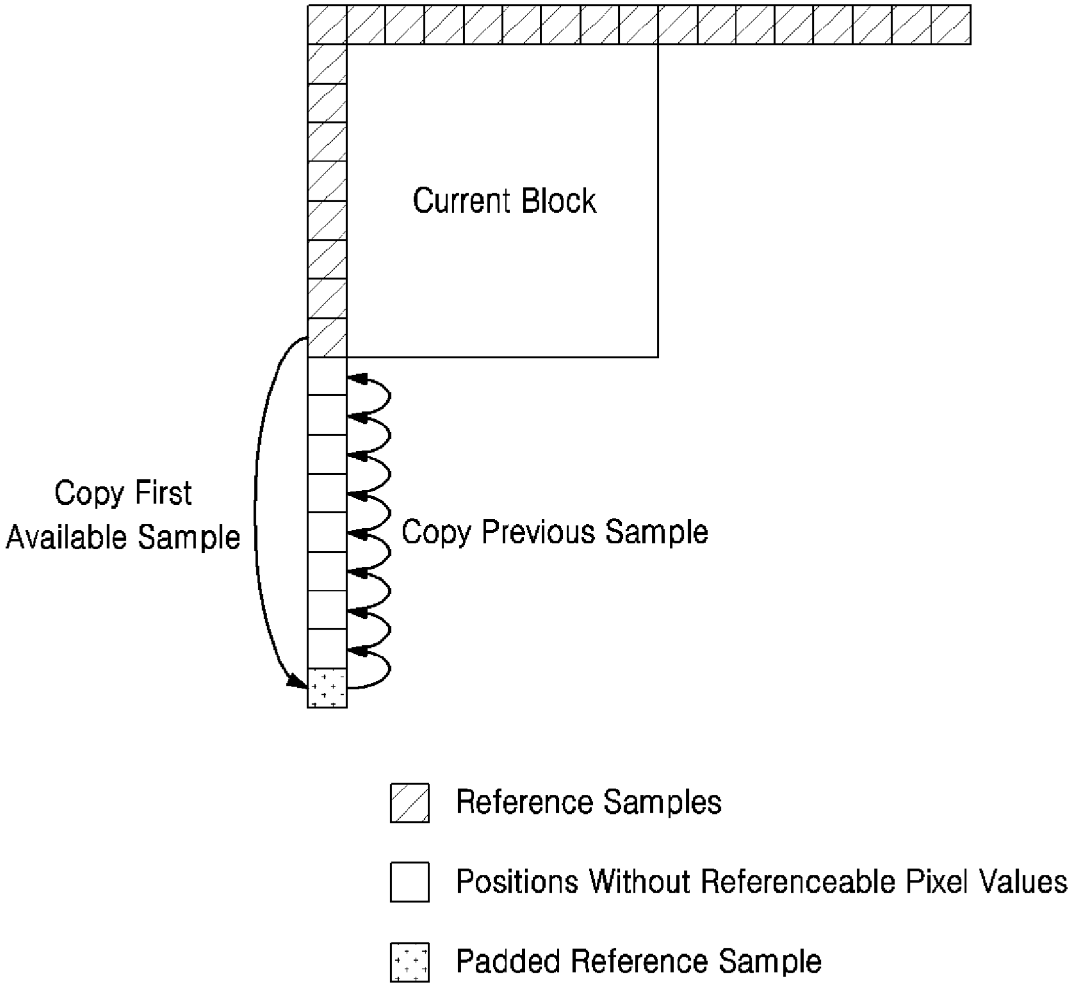
FIGS. 7A and 7B are diagrams illustrating the generation of reference samples.
Figure 7B:
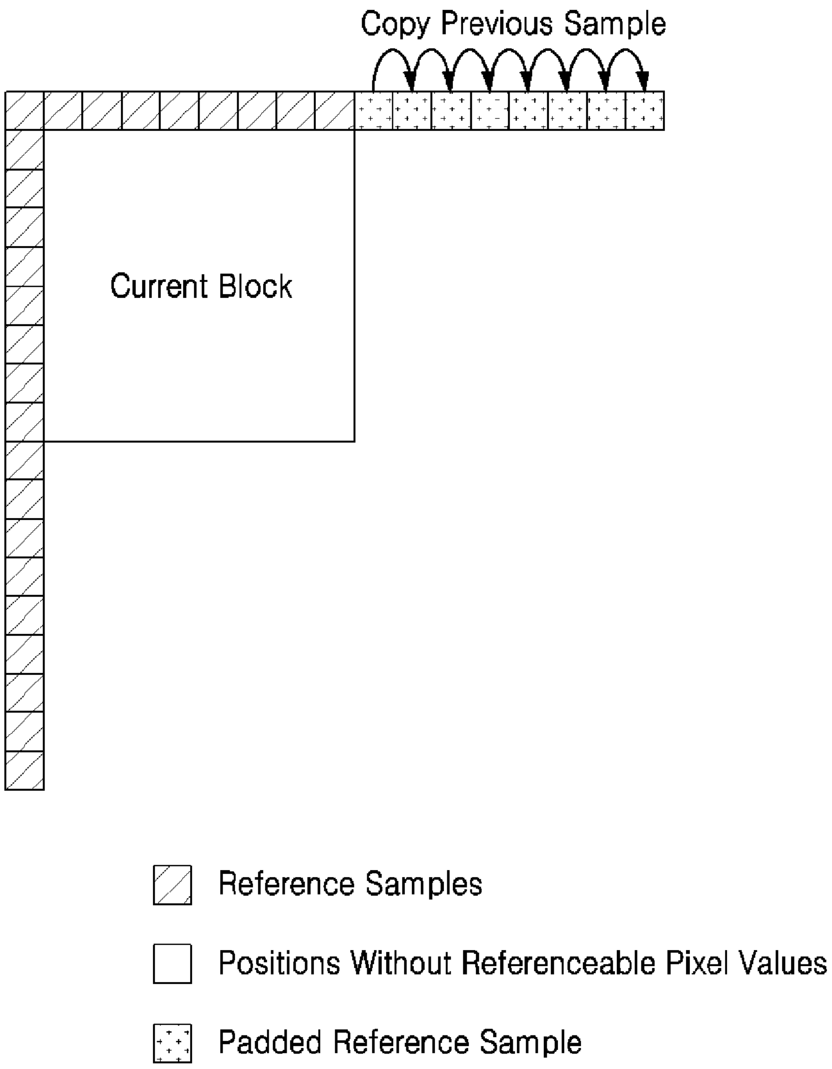

FIGS. 7A and 7B are diagrams illustrating the generation of reference samples.

If all reference pixels are available, the video decoding device does not perform padding and uses each reference pixel value. On the other hand, as described above, if some of the available reference samples are not present, the pixel values may be padded, as illustrated in the examples of FIGS. 7A and 7B. First, if the bottom-left reference sample is not available, the first available reference sample in the search order is copied and padded to the bottom-left reference sample, as shown in the example of FIG. 7A. Then, if no reference sample other than the bottom-left reference sample is available, the pixel value at the immediately preceding position in the search sequence is copied and padded to the current position, as shown in the examples of FIGS. 7A and 7B.

As described above, if no reference samples are available at all positions, the video decoding device pads each position with $2^{Bitdepth-1}$, which is half of the maximum value that the pixel can have. Namely, 128 may be utilized if the Bitdepth is 8 bits, and 512 may be utilized if the Bitdepth is 10 bits.

After generating the reference samples according to the method described above, the video decoding device may apply a filter to generate the final reference sample p[x][y]. First, the video decoding device may set filterFlag, a flag indicating the application of a filter, to 1 if the reference line index refIdx is 0, the size of the current block is greater than 32, the current block is a luma component, the IntraSubPartitionsSplitType of the ISP mode is ISP_NO_SPLIT, and refFilterFlag, a flag indicating the filtering of the reference samples, is 1. If any of the above described conditions are not satisfied, filterFlag may be set to 0.

Then, if filterFlag is true, the final reference sample p[x][y] may be calculated as in Equation 1.

[Equation 1]

$$p[-1][-1] = (refUnfilt[-1][0] + 2 \cdot refUnfilt[-1][-1] + refUnfilt[0][-1] + 2) >> 2$$

$$p[-1][y] = (refUnfilt[-1][y+1] + 2 \cdot refUnfilt[-1][y] + refUnfilt[-1][y-1] + 2) >> 2,\ y = 0 \ldots refH - 2$$

$$p[-1][refH-1] = refUnfilt[-1][refH-1]$$

$$p[x][-1] = (refUnfilt[x-1][-1] + 2 \cdot refUnfilt[x][-1] + refUnfilt[x+1][-1] + 2) >> 2,\ x = 0 \ldots refW - 2$$

$$p[refW-1][-1] = refUnfilt[refW-1][-1]$$

On the other hand, if filterFlag is false, then p[x][y]=refUnfilt[x][y] for x=−1−refIdx, y=−1−refIdx . . . refH−1 and x=−refIdx . . . refW−1, y=−1−refIdx.

I-2. Position-Dependent Prediction Combination (PDPC) Technique

When intra prediction is performed, if the distance between the pixels in the current block and the reference sample is large, the spatial correlation is reduced, which may lower the prediction performance of the generated predictor. To address this issue, a position-dependent prediction combination (PDPC) technique is used. PDPC technique corrects the predictor pixel to be used for encoding by weighted combining the neighboring pixels in the opposite direction and the predictor generated according to the intra-prediction mode. The closer the distance between the opposite direction neighboring pixel and the corresponding predictor pixel, the higher the weight of the opposite direction neighboring pixel. PDPC technique may be applied to prediction modes that can utilize neighboring pixels in the opposite direction of the prediction mode direction line. These prediction modes include modes that are equal to or smaller than the horizontal mode (mode 18), modes greater than the vertical mode (mode 50), and four specific modes of planar mode, DC mode, horizontal mode (mode 18), and vertical mode (mode 50).

The PDPC technique uses Equation 2 to correct the predictor for the planar mode and the DC mode, uses Equation 3 to correct the predictor for the horizontal mode (mode 18), and uses Equation 4 to correct the predictor for the vertical mode (mode 50). Further, the PDPC technique uses Equation 5 to correct the predictor based on the modes less than the horizontal mode (mode 18) and uses Equation 6 to correct the predictor based on the modes greater than the vertical mode (mode 50).

[Equation 2]

$$nScale = (\log2(nTbW) + \log2(nTbH) - 2) >> 2$$

$$wL[x] = 32 \gg ((x \ll 1) \gg nScale)$$

$$wT[y] = 32 >> ((y << 1) >> nScale)$$

$$pred[x][y] = Clip1((p[-1][y] \cdot wL[x] + p[x][-1] \cdot wT[y] + (64 - wL[x] - wT[y]) \cdot pred[x][y] + 32 >> 6)$$

[Equation 3]

$$nScale = (\log2(nTbW) + \log2(nTbH) - 2) \gg 2$$

$$wL[x] = 0,\ wT[y] = 32 >> ((y << 1) >> nScale)$$

$$pred[x][y] = Clip1(((p[x][-1] - p[-1][-1] + pred[x][y]) \cdot wT[y] + (64 - wT[y]) \cdot pred[x][y] + 32) \gg 6)$$

[Equation 4]

$$nScale = (\log2(nTbW) + \log2(nTbH) - 2) >> 2$$

$$wL[x] = 32 \gg ((x \ll 1) \gg nScale),\ wT[y] = 0$$

$$pred[x][y] = Clip1(((p[-1][y] - p[-1][-1] + pred[x][y]) \cdot wL[x] + (64 - wL[x]) \cdot pred[x][y] + 32) \gg 6)$$

[Equation 5]

$$nScale = \min(2, \log2(nTbW) - \mathrm{Floor}(\log2(3 \cdot invAngle - 2)) + 8)$$

$$dX[x][y] = x + ((y+1) \cdot invAngle + 256) \gg 9$$

$$refT[x][y] = (y < (3 << nScale))?\ p[dX[x][y]][-1]:\ 0$$

$$refT[x][y] = (y < (3 << nScale))?\ p[dX[x][y]][-1]:\ 0$$

$$pred[x][y] = Clip1((refT[x][y] \cdot wT[y] + (64 - wT[y]) \cdot predd[x][y] + 32) >> 6)$$

[Equation 6]

$$nScale = \min(2, \log2(nTbH) - \mathrm{Floor}(\log2(3 \cdot invAngle - 2)) + 8)$$

$$dX[x][y] = y + ((x+1) \cdot invAngle + 256) \gg 9$$

-continued $$refL[x][y] = (y < (3 << nScale))?\ p[-1][dY[x][y]]: 0$$

$$wL[x] = 32 \gg ((x \ll 1) \gg nScale)),\ wT[y] = 0$$

$$pred[x][y] = Clip1$$

$$((refL[x][y] \cdot wL[x] + (64 - wL[x]) \cdot pred[x][y] + 32) >> 6)$$

Here, [x][y] represents the pixel relative to the coordinates of the top-left pixel of the current block. pred[x][y] is the initial predictor generated by prediction mode, and p[x][−1] and p [−1][y] are the neighboring pixels used to correct the predictor. nTbW and nTbH represent the width and height of the current block, and wL[x] and wT[y] represent the weights applied to the predictor pixels and neighboring pixels. Clip1 is the clipping function, expressed as shown in Equation 7.

$$Clip1(x) = Clip3(0, 1 << BitDepth, x) \quad \text{[Equation 7]}$$

$$Clip3(x, y, z) = \begin{cases} x\ (z < x) \\ y\ (z > y) \\ z\ (\text{otherwise}) \end{cases}$$

Additionally, invAngle is a variable used in intra-prediction mode to specify the location of the neighboring pixels required when generating predictors in concert with each direction. In the VVC (Versatile Video Coding) technique, invAngle is calculated as shown in Equation 8.

$$invAngle = \text{Round}\left(\frac{(512 \cdot 32)}{intraPredAngle}\right) \quad \text{[Equation 6]}$$

Here, intraPredAngle is a value determined by the intra-prediction mode (PredModeIntra).

I-3. Most Probable Mode (MPM) Technique

As described above, in intra prediction, a predictor for the luma channel may be generated based on 67 Intra-prediction modes (IPMs). The 67 IPMs refer to 67 intra-prediction modes that may be signaled based on the block aspect ratio, from prediction mode-14 to prediction mode 80, including the non-directional prediction modes of planar mode and DC mode. When a predictor is generated by using one of the 67 prediction modes, the video encoding device signals the prediction mode by using the Most Probable Mode (MPM) to efficiently transmit the prediction mode information.

Figure 8:
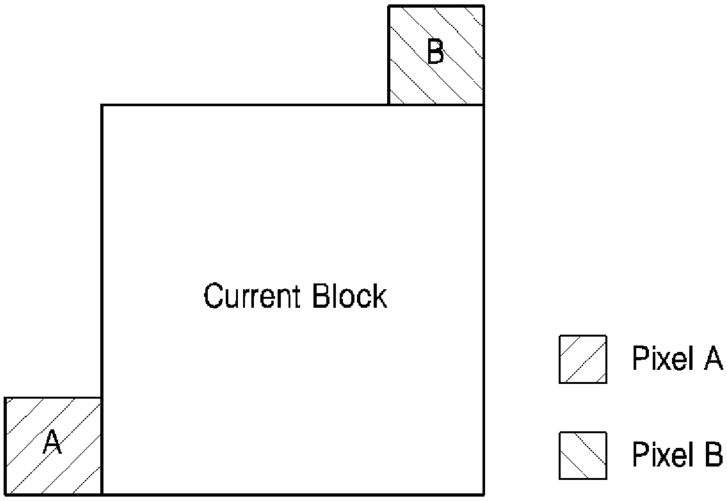
FIG. 8 is a diagram illustrating pixels utilized in a Most Probable Mode (MPM) configuration.

MPM takes advantage of the property that when blocks are encoded in intra-prediction mode, the prediction modes of neighboring blocks are likely to be similar to each other. As illustrated in FIG. 8, for blocks containing pixel A located to the left of the bottom-left pixel of the current block and pixel B located over the top-right pixel of the current block, the respective blocks' prediction modes are defined as modeA and modeB. Based on modeA and modeB, an MPM list may be generated by selecting six MPM candidates as follows. If the current block is located on the boundary of a CTU, tile, slice, sub-picture, picture, and the like and pixel A or pixel B is not available, the prediction mode of the block containing the pixel of interest is considered to be the planar.

First, if modeA and modeB are the same and modeA is greater than INTRA_DC, then {planar, modeA, 2+((modeA+61) % 64), 2+((modeA−1) % 64), 2+((modeA+60) % 64), 2+(modeA % 64)} are selected as MPM candidates.

Next, if modeA and modeB are not the same, and either modeA or modeB is greater than INTRA DC, then the MPM candidates are organized as follows. Here, minAB=Min (modeA, modeB), maxAB=Max(modeA, modeB).

If both modeA and modeB are greater than INTRA_DC, and maxAB−minAB=1, then {planar, modeA, modeB, 2+((minAB+61) % 64), 2+((maxAB−1) % 64), 2+((minAB+60) % 64)} are selected as MPM candidates.

If both modeA and modeB are greater than INTRA_DC, and maxAB−minAB≥62, then {planar, modeA, modeB, 2+((minAB−1) % 64), 2+((maxAB+61) % 64), 2+(minAB % 64)} are selected as MPM candidates.

If both modeA and modeB are greater than INTRA_DC, and maxAB−minAB=2, then {planar, modeA, modeB, 2+((minAB−1) % 64), 2+((minAB+61) % 64), 2+((maxAB−1) % 64)} are selected as MPM candidates.

If both modeA and modeB are greater than INTRA DC, and 2<maxAB−minAB<62, then {planar, modeA, modeB, 2+((minAB+61) % 64), 2+((minAB−1) % 64), 2+((maxAB+61) % 64)} are selected as MPM candidates.

If modeA and modeB are not the same, and one of modeA and modeB is greater than INTRA DC, then {planar, maxAB, 2+((maxAB+61) % 64), 2+((maxAB−1) % 64), 2+((maxAB+60) % 64), 2+(maxAB % 64)} are selected as MPM candidates.

Further, if both modeA and modeB are equal to or less than INTRA DC, then {planar, INTRA DC, INTRA ANGULAR50, INTRA ANGULAR18, INTRA ANGULAR46, INTRA_ANGULAR54} are selected as MPM candidates.

Meanwhile, when MPM is used, the video decoding device parses the intra-prediction mode of the current block as shown in Table 1.

TABLE 1

```
if( intra_luma_ref_idx  ==  0 )
  intra_luma_mpm_flag[ x0 ][ y0 ]
if( intra_luma_mpm_flag[ x0 ][ y0 ] ) {
  if( intra_luma_ref_idx  ==  0 )
    intra_luma_not_planar_flag[ x0 ][ y0 ]
  if( intra_luma_not_planar_flag[ x0 ][ y0 ] )
    intra_luma_mpm_idx[ x0 ][ y0 ]
} else
  intra_luma_mpm_remainder[ x0 ][ y0 ]
}
```

First, if intra_luma_ref_idx, a reference line index indicating one of a plurality of reference lines, is zero, intra_luma_mpm_flag, a flag indicating whether MPM is enabled, may be signaled from the video encoding device to the video decoding device. If intra_luma_mpm_flag is true and intra_luma_ref_idx is 0, intra luma not_planar_flag, a flag indicating whether planar mode is enabled, may be signaled from the video encoding device to the video decoding device. If intra luma not planar flag is false, the intra-prediction mode is set to planar mode, and if intra_luma_not planar_flag is true, intra_luma_mpm_idx may be additionally signaled. If intra luma not planar_flag is not present, it may be inferred to be 1.

On the other hand, if intra luma ref_idx is non-zero, the planar mode is not used. Therefore, intra_luma not_ planar_flag is not transmitted and is assumed to be true. Since intra_luma_not_planar_flag is true, intra_luma_mpm_idx may be additionally signaled.

Next, if intra_luma_mpm_flag is false, MPM remainder is signaled as the intra-prediction mode.

As described above, MPM index 0 which refers to the first element in the MPM list, always indicates planar mode and is therefore determined by using the intra_luma_not_planar_flag. MPM indices 1 to 5 are determined by using intra_luma_mpm_idx and encoded according to the Truncated Rice (TR) binarization where cMax=4 and cRiceParam=0. In this case, the bin string may be generated as follows.

The TR binarization uses cMax and cRiceParam to output a TR bin string corresponding to symbolVal. The TR bin string is the prefix bin string and the suffix bin string combined, where the suffix bin string exists if cMax and symbolVal are equal and cRiceParam is greater than zero.

The prefix bin string is derived as follows.

First, the prefix value for symbolVal, prefixVal, is derived by prefix Val=symbolVal>>cRiceParam.

Next, the prefix of the TR bin string (i.e., the prefix bin string) is determined as follows.

If prefix Val is less than 'cMax>>cRiceParam', then the length of the prefix bin string is prefix Val+1, and each bin is indexed by using binIdx. Bins with binIdx less than prefix Val are set to 1, and bins with binIdx equal to prefix Val are set to 0.

If prefix Val is 'cMax>>cRiceParam' or greater, the length of the prefix bin string is 'cMax>>cRiceParam', and all bins are set to 1.

The suffix bin string of the TR bin string is derived as follows.

First, the suffix value, suffixVal, is derived by suffix Val=symbolVal−(prefix Val<<cRiceParam).

Next, the suffix of the TR bin string (i.e., the suffix bin string) is determined by a fixed-length (FL) binarization process such that cMax is (1<<cRiceParam)−1 for suffix Val.

By summarizing the foregoing, a bin string of MPM indices may be represented as shown in Table 2. Here, the symbolVal sets 5 MPM candidates according to the MPM index strating from 0, except for the MPM index 0.

TABLE 2

| MPM Index | symbolVal | Bins string | | | |
|---|---|---|---|---|---|
| 0 | | intra_luma_not_planar_flag | | | |
| 1 | 0 | 0 | — | — | — |
| 2 | 1 | 1 | 0 | — | — |
| 3 | 2 | 1 | 1 | 0 | — |
| 4 | 3 | 1 | 1 | 1 | 0 |
| 5 | 4 | 1 | 1 | 1 | 1 |
| binIdx | | 0 | 1 | 2 | 3 |

As described above, if intra_luma_mpm_flag is 0 (i.e., MPM is not used), intra_luma_mpm_remainder is parsed as MPM remainder. In this case, intra_luma_mpm_remainder is encoded according to Truncated Binary (TB) binarization with cMax=60. The bin string may be generated as follows.

The TB binarization outputs a TB bin string corresponding to the syntax element symbolVal, by using cMax. Before determining the TB bin string, the value of u is calculated according to Equation 9.

$$n = \text{cMax} + 1$$
$$k = \text{Floor}(\text{Log2}(n))$$
$$u = (1 << (k+1)) - n \quad \text{[Equation 9]}$$

Using the definition in Equation 9, the TB bin string is determined as follows.

First, if symbolVal is less than u, the TB bin string is determined by a fixed-length (FL) binarization process with a cMax of (1<<k)−1 for symbolVal. On the other hand, if symbolVal is greater than or equal to u, the TB bin string is determined by a fixed-length (FL) binarization process with a cMax of (1<<(k+1))−1 for (symbolVal+u).

By summarizing the foregoing, the bin string of the MPM remainder may be represented as shown in Table 3. Here, the symbolVal is the set of 61 intra-prediction modes, excluding the 6 MPM candidates, in order from 0 to smallest. The bin string representing 3 symbolValues, 0 to 2, is allocated 5 bits, and the bin string representing 58 symbolValues, 3 to 60, is allocated 6 bits.

TABLE 3

| symbolVal | Standard Binary | Truncated Binary (VVC) |
|---|---|---|
| 0 | 000000 | 00000 |
| 1 | 000001 | 00001 |
| 2 | 000010 | 00010 |
| 3 | 000011 | 000110 |
| 4 | 000100 | 000111 |
| . | . | . |
| . | . | . |
| . | . | . |
| 59 | 111011 | 111110 |
| 60 | 111100 | 111111 |

II. Adaptive Intra-Modal Coding

Figure 9A:
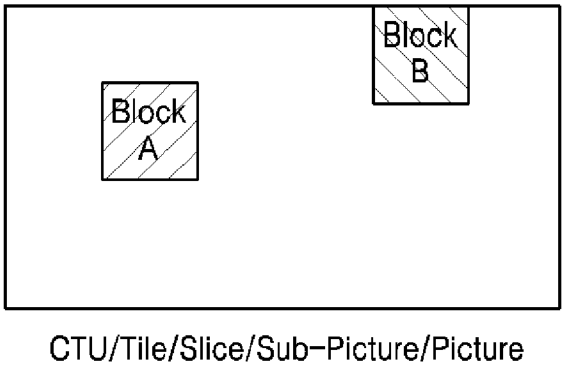
FIG. 9A and FIG. 9B are diagrams illustrating predictors based on block position and prediction mode.
Figure 9B:
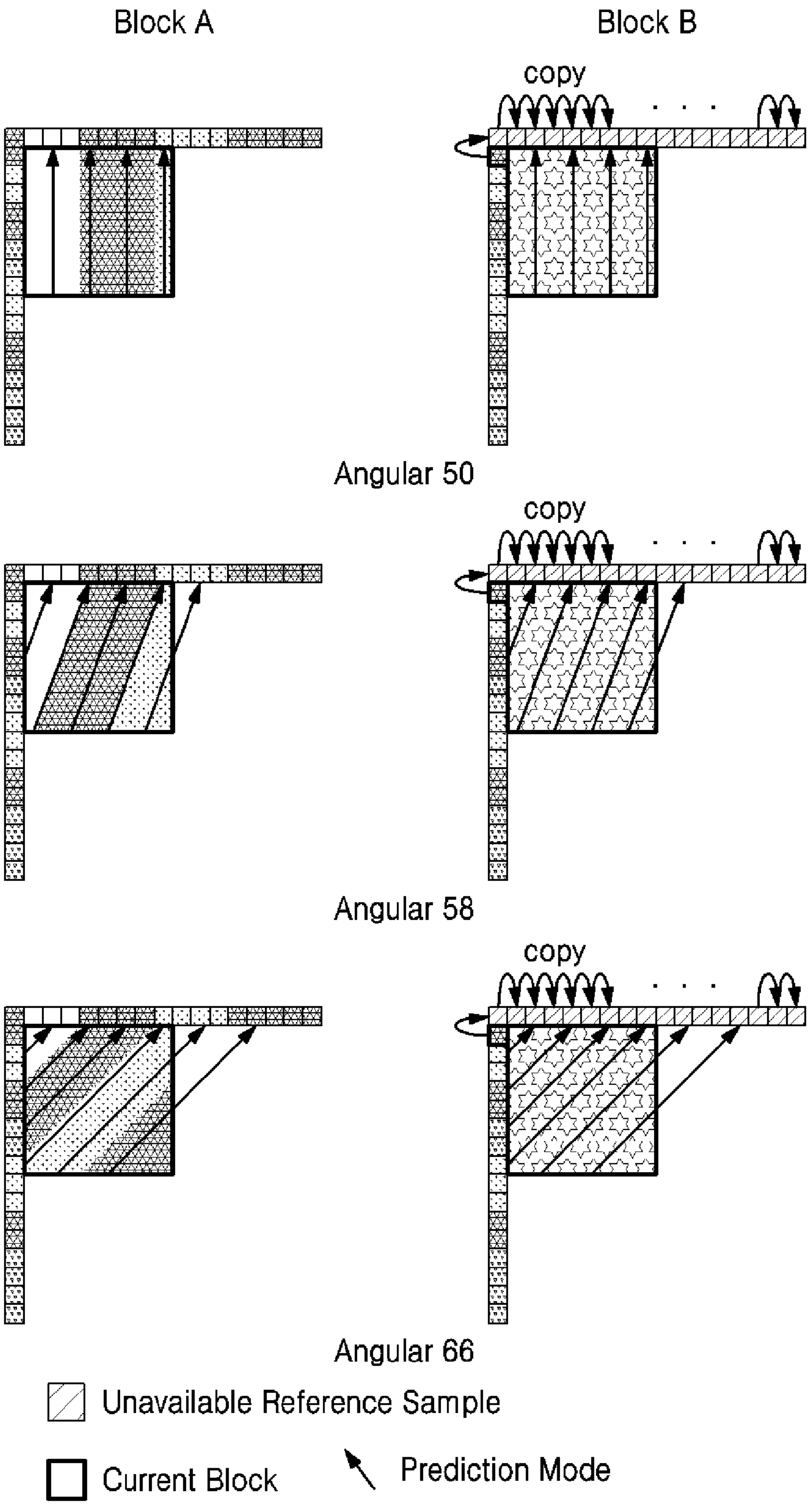

On the other hand, if the current block is on the boundary of the image, the same predictor may be generated even if different prediction modes are used. For blocks that exist on the boundary of an image, such as CTUs, tiles, slices, sub-pictures, pictures, and the like, all or some of the top and left reference pixels may not be present among the reference pixels used for block prediction. In such cases, after the reference pixels is generated by using padding, the intra-prediction method is used to generate a predictor. Even if different prediction modes are used, the same predictor may be generated, as shown in the examples of FIG. 9A and FIG. 9B. For example, if the current block is not located at the boundary of the image (boundary of a CTU, tile, slice, sub-picture, picture, and the like), such as block A in FIG. 9A, a different predictor is generated depending on the prediction mode if all reference pixels are present and the reference pixel values are not the same, as shown in the example of FIG. 9B. However, if the current block is located at the top boundary of the image (the top boundary of a CTU, tile, slice, sub-picture, picture, and the like), such as block B in FIG. 9A, then the top reference pixels are not present, so reference pixels that all have the same value are generated by using a padding process, as shown in the example of FIG. 9B.

Therefore, when PDPC is not considered, prediction modes of and above the vertical mode (mode 50) all generate the same predictor because prediction modes of and above the vertical mode (mode 50) all use for prediction the reference pixels padded with the same value. Due to the possible generation of the same predictor even with different prediction modes used depending on the position of the block, unnecessary prediction mode transfers, and prediction mode search processes cause inefficiencies. These inefficiencies of existing technologies can be solved by adaptively encoding/decoding the prediction mode according to the block position.

Figure 10:
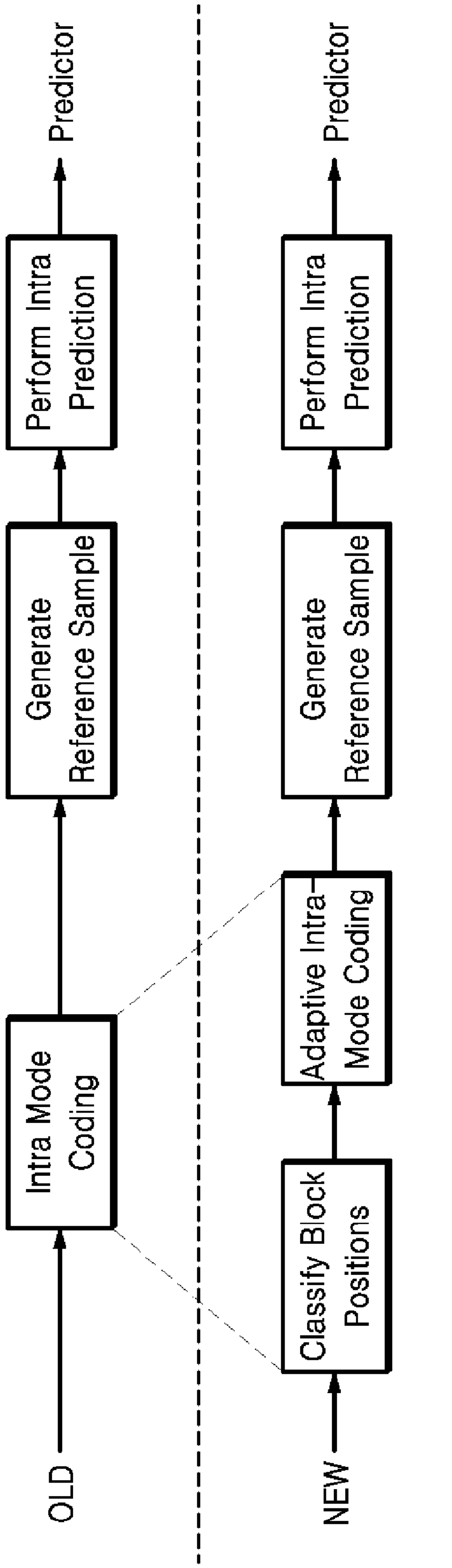
FIG. 10 is a diagram illustrating encoding/decoding in intra-prediction mode, according to at least one embodiment of the present disclosure.

In the example of FIG. 10, OLD denotes an intra-prediction mode encoding/decoding method according to a conventional technique such as VVC, and NEW denotes an adaptive prediction mode encoding/decoding method based on the block position according to the present disclosure.

The present disclosure solves the problems of the existing technology by using "block position classification" for classifying blocks according to the current block position and "adaptive intra mode coding" for adaptively coding the prediction mode accordingly.

Preferred implementations are as follows.

Figure 11:
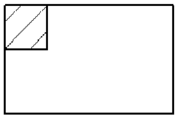
FIG. 11 is a diagram illustrating a type of current block based on position, according to at least one embodiment of the present disclosure.
Figure 11:
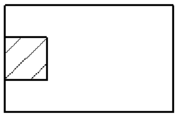
Figure 11:
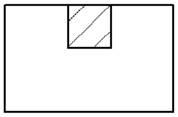
Figure 11:
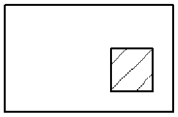

Hereinafter, for convenience, the horizontal intra-prediction mode (mode 18) is referred to as HOR, and the vertical intra-prediction mode (mode 50) is referred to as VER. Further, block position information is used to classify the type of the current block as shown in the example of FIG. 11. The block position information includes the coordinates of the top-left corner position within the current block. The block position information also includes information about the composition of CTUs, tiles, slices, sub-pictures, and pictures, how they are partitioned, and the size of each element. The block position information may also include a relative position of the current block within the CTU, tile, slice, sub-picture, or picture.

Further, based on the block position, the current block may be classified into four types: Type 1, Type 2, Type 3, and Type 4. In Type 1, the current block is located in the top-left corner of a CTU, tile, slice, sub-picture, or picture. In Type 2, Type 1 is excluded and the current block is located on the left boundary of a CTU, tile, slice, sub-picture, or picture. In Type 3, Type 1 is excluded and the current block is located on the top boundary of a CTU, tile, slice, sub-picture, or picture. Type 4 represents cases other than Types 1 through 3 above.

Implementations are described below with reference to the video decoding device but may be similarly applied to the video encoding device.

<Implementation 1> Determining a Preset Prediction Mode Based on the Position of the Block In this implementation, the video decoding device does not decode the prediction mode of the current block but uses a preset prediction mode based on the type of the current block. Depending on the type of the current block based on the block position illustrated in FIG. 11, the video encoding device performs the following operations.

In the case of type 1, since all reference pixels on the left and top are unavailable, any of the different prediction modes will generate the same predictor. Therefore, the preset prediction mode may be used since prediction mode searching and signaling are unnecessary. In this case, the video encoding device may omit prediction mode searching and signaling.

For Type 2 and Type 3, since the left or top reference pixels are unavailable, the corresponding values are padded. Thus, some prediction modes end up generating the same predictor. Therefore, the preset prediction mode may be used since prediction mode searching and signaling are unnecessary. Similarly, in this case, the video encoding device may omit prediction mode searching and signaling.

In the case of type 4, since all reference pixels in the block are available, different predictors may be generated depending on the prediction mode. Therefore, the video encoding device may select and encode the most appropriate prediction mode according to conventional methods, and the video decoding device may parse the information and then may decode the intra-predicted signal according to the parsed prediction mode.

Whether or not to use the preset prediction mode may be determined for each type, and for blocks corresponding to a type that does not use the preset prediction mode, the intra-prediction mode may be encoded/decoded by using a conventional intra-mode encoding/decoding method. Here, all possible cases may be summarized as shown in Table 4.

TABLE 4

| | Implicit Mode Decision Type | Use Existing Technology |
|---|---|---|
| 1 | Type 1 | Type 2, Type 3, Type 4 |
| 2 | Type 2 | Type 1, Type 3, Type 4 |
| 3 | Type 3 | Type 1, Type 2, Type 4 |
| 4 | Type 1, Type 2 | Type 3, Type 4 |
| 5 | Type 1, Type 3 | Type 2, Type 4 |
| 6 | Type 2, Type 3 | Type 1, Type 4 |
| 7 | Type 1, Type 2, Type 3 | Type 4 |

Here, the implicit mode decision type indicates a type that uses a preset prediction mode.

Figure 12:
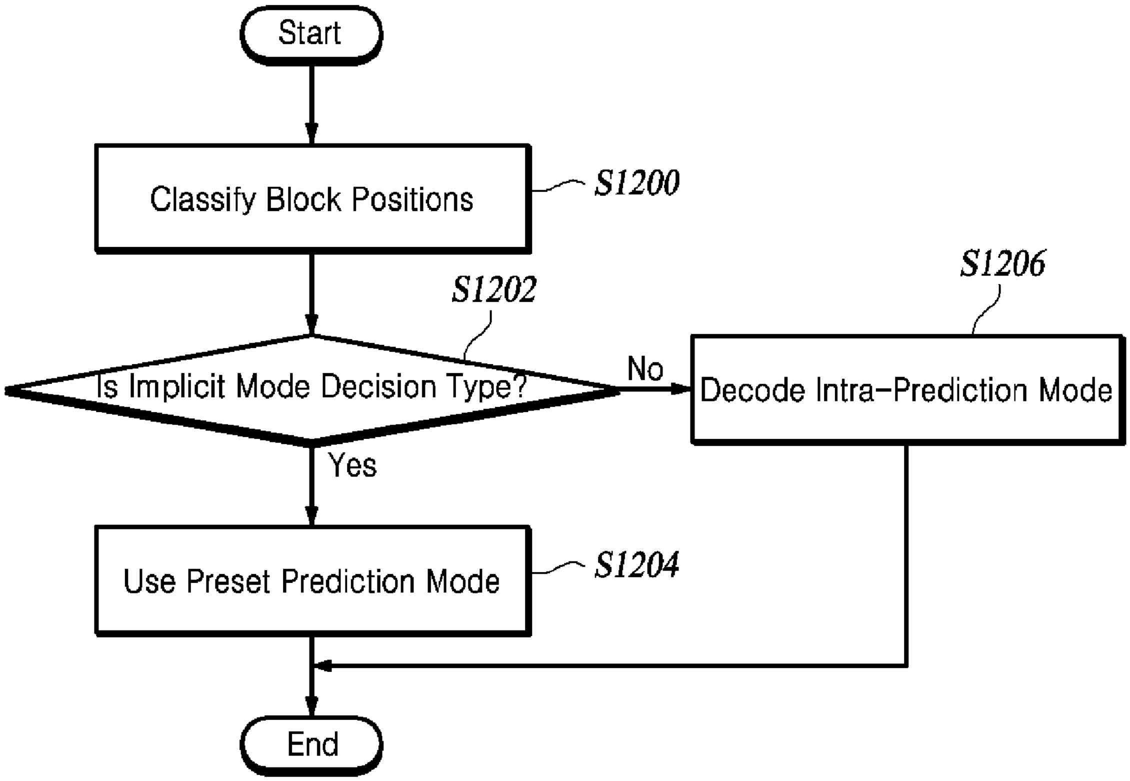
FIG. 12 is a flowchart of a method of decoding an intra-mode based on a block position, according to at least one embodiment of the present disclosure.

FIG. 12 is a flowchart of a method of decoding an intra-mode based on a block position, according to at least one embodiment of the present disclosure.

The video decoding device classifies the current block according to the block position (S1200), and determines whether the type of the current block is an implicit mode decision type (S1202). At this time, the decision criterion of the implicit mode decision type may be selected from one of the seven cases presented in Table 4.

If the current block is of the implicit mode decision type (Yes in S1202), the video decoding device uses the preset prediction mode as the prediction mode of the current block (S1204). The video decoding device sets the prediction mode for the block of type k (where k may be 1, 2, or 3) corresponding to the implicit mode decision type to pre_defined_mode_k. For example, if the type of the current block is type 2 which is an implicit mode decision type, the prediction mode of the current block is set to pre_defined_mode_2.

If the current block is not of an implicit mode decision type (No in S1202), the video decoding device decodes the intra-prediction mode from the bitstream according to a conventional method (S1206).

The prediction mode decision process according to the example of FIG. 12 may be similarly performed by the video encoding device.

Figure 13:
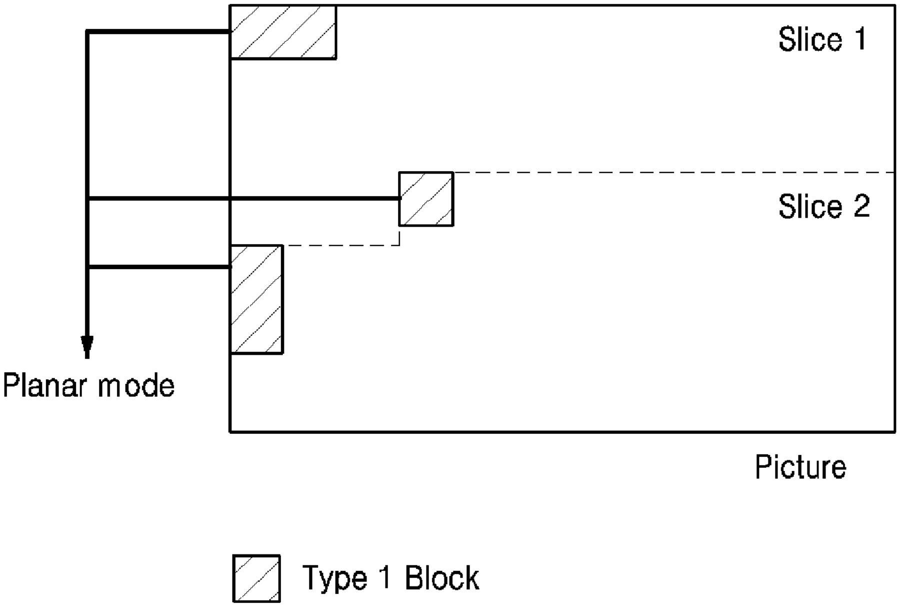
FIG. 13 is a diagram illustrating a preset mode of a type 1 block, according to at least one embodiment of the present disclosure.

The aforementioned pre_defined_mode_k may be one of 67 IPMs, such as planar, DC, horizontal mode (mode 18), vertical mode (mode 50), and the like. For example, as shown in the example in FIG. 13, a block located in the top-left corner of a slice or picture is classified as Type 1. If pre_defined_mode_1 is preset to planar mode, the video encoding device omits the intra-prediction mode searching and signaling for the relevant blocks and determines planar mode as the prediction mode.

The syntax according to this implementation is shown in Table 5.

TABLE 5

```
else {
  if ( implicit_mode_decision ) {
    blockPositionAdaptiveModeDecision ( currBlockType )
  } else {
```

TABLE 5-continued

```
        if( sps_bdpcm_enabled_flag  &&
            cbWidth  <=  MaxTsSize  &&  cbHeight  <=  MaxTsSize )
            ...
        }
    }
```

If implicit_mode_decision, a syntax indicating implicit mode decision is 1, prediction mode searching and signaling are omitted for the current block, and the video decoding device uses the preset prediction mode corresponding to the type of the current block. currBlockType indicates the type of the current block. The function blockPositionAdaptiveModeDecision (currBlockType) sets the prediction mode of the current block to pre_defined_mode_k if currBlockType is of type k. On the other hand, if implicit_mode_decision is 0, the video decoding device may decode the prediction mode of the current block by using a conventional intra-mode decoding method.

<Implementation 2> Decoding the Prediction Mode of the Current Block by Composing the MPM List Differently Depending on the Block Position In this implementation, the video decoding device adaptively composes the MPM list based on the type of the current block, classified according to the position of the block, and decodes the intra-prediction mode of the current block by using the composed MPM list. The conventional VVC selects six MPM candidates based on the prediction mode of current block's neighboring blocks. If the intra-prediction mode of the current block is one of the six MPM candidates, the conventional VVC decodes the MPM index that indicates the prediction mode and thereby determines the prediction mode.

According to this implementation, the video decoding device may (Implementation 2-1) compose the MPM list according to a predefined method, (Implementation 2-2) remove a redundant prediction mode from an existing MPM list composing method, or (Implementation 2-3) remove a redundant prediction mode from an existing MPM list composing method and add one or more MPM candidates according to a predefined method. In this case, if an intra-prediction mode generates the same predictor as an intra-prediction mode other than itself, the generated prediction mode is called a redundant prediction mode.

<Implementation 2-1> Composing MPM List According to a Predefined Method

In this implementation, the video decoding device composes the MPM list such that the MPM list does not include redundant prediction modes by using a predefined method based on the type of the current block. The predefined method refers to (Implementation 2-1-1) determining the number of MPM candidates or (Implementation 2-1-2) selecting MPM candidates. The MPM candidates may be determined differently depending on the type of the current block.

<Implementation 2-1-1> Determining the Number of MPM Candidates Based on the Type of the Current Block In this implementation, the video decoding device may determine all the same, some different, or all different numbers of MPM candidates depending on the type of current block. Hereinafter, the number of MPM candidates per type of current block is defined as $n_{type}$. Here, type is assumed to be a value from 1 to 4 according to the example in FIG. 11. In this case, by setting $n_1=4$, $n_2=5$, $n_3=5$, $n_4=6$, the present disclosure may compose an MPM list having different numbers of candidates according to the type of the current block. As described above, if the current block is of type 1 representing $n_1=4$, the MPM list may be composed of four prediction modes.

<Implementation 2-1-2> Selecting MPM Candidates Based on the Type of the Current Block In this implementation, the video decoding device may select MPM candidates by using different, partially identical, or all identical methods depending on the type of the current block. In selecting the prediction mode, at least one of the following may be considered: current block's width, height, area, and aspect ratio, and neighboring blocks' prediction mode and position information. The selected prediction mode may be a prediction mode that uses a reconstructed reference pixel, a prediction mode of a neighboring block, a prediction mode that has been used with high frequency in the past, or a prediction mode that may additionally use a reference pixel reconstructed by the position-dependent prediction combination (PDPC) technique.

As described above, PDPC corrects the predictor by using a weighted combination of filtered and unfiltered reference samples based on pixel position, prediction mode, and block size. PDPC may be applied to planar, DC, prediction modes in horizontal orientation or below (mode 18 or less), and prediction modes in vertical orientation or above (mode 50 or more). According to conventional VVC (Versatile Video Coding) techniques, the use of the PDPC technique is not separately signaled at the CU level but is adaptively determined based on the prediction mode and the block size.

Hereinafter, PDPC applicable/non-applicable indicates that the PDPC technique is enabled/disabled at a higher level such as SPS, PPS, and the like and PDPC available/unavailable indicates whether the PDPC is used in the current block when the PDPC technique is enabled.

In a conventional VVC, the range and number of PDPC-unavailable intra-prediction modes depending on the size of the block are shown in Table 6.

TABLE 6

| W | PDPC- unavailable | Num. | H | PDPC- unavailable | Num. |
|---|---|---|---|---|---|
| 4 | −3, −2, −1, 2~17 | 19 | 4 | 51~69 | 19 |
| 8 | 5~17 | 13 | 8 | 51~63 | 13 |
| 16 | 11~17 | 7 | 16 | 51~57 | 7 |
| 32 | 14~17 | 4 | 32 | 51~54 | 4 |
| 64 | 16, 17 | 2 | 64 | 51, 52 | 2 |

Here, W and H represent the width and height of the current block, respectively. For example, in Table 6, if the width of the current block is 8 (W=8), the PDPC-unavailable prediction mode ranges from prediction mode 5 to prediction mode 17, and if the height of the current block is 4 (H=4), the PDPC-unavailable prediction mode ranges from prediction mode 51 to prediction mode 69. Thus, if (W, H)=(8, 4) with the current block, then prediction modes 5 through 17, 19 through 49, and 51 through 69 cannot use PDPC. In this case, prediction modes 19 through 49 can never use PDPC.

The MPM list of the type-3 block according to the above is composed as follows.

If the left block exists, the video decoding device adds the prediction mode of that block to the MPM list. Here, the position of the top-left pixel of the current block is called (x0, y0) and the height of the current block is called h wherein the left block represents a block containing (x0−1, y0+h−1) pixels.

The video decoding device also adds to the MPM list a horizontal mode (18, HOR) used for predicting the reconstructed reference pixels and its neighboring prediction mode (±n, where n is an integer greater than or equal to 1).

Further, the video decoding device continues to add to the MPM list the prediction modes that further utilize the reconstructed reference pixels by using PDPC.

Figure 14:
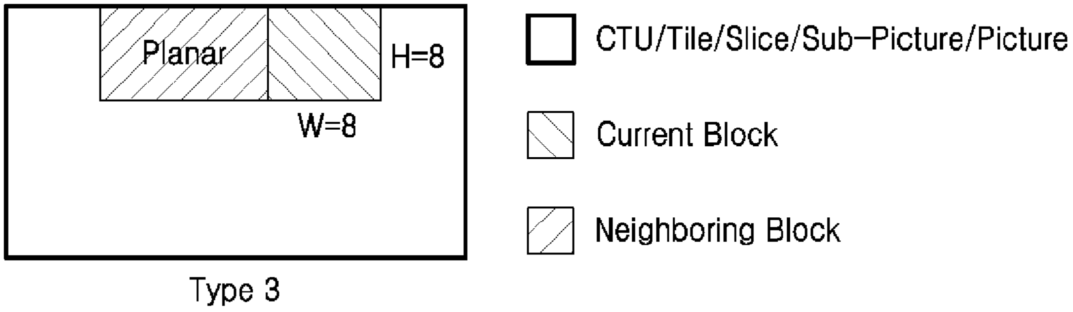
FIG. 14 is a diagram illustrating a composition of an MPM list, according to at least one embodiment of the present disclosure.

When the number of MPM candidates in a type-3 block is 6 ($n_3$=6), an example of applying the above-described MPM list composing method to the current block illustrated in FIG. 14 is as follows. At this time, when the prediction modes are added as many as the set $n_3$, the video decoding device stops composing the list.

The video decoding device adds the prediction mode of the left block, planar, to the MPM list, and adds the horizontal mode and its neighboring modes, HOR, HOR−2, and HOR+2 (this example sets n=2).

Thereafter, since the width and height of the current block are each 8, PDPC is used for prediction modes of prediction mode 64 and above. Since these prediction modes use both the padded top reference pixel and the reconstructed left reference pixel, they may generate predictors more efficiently than by using the VER (vertical intra-prediction) mode and modes near the VER that do not use PDPC. Therefore, beginning with mode 64 and above, the video decoding device adds prediction modes by incrementing the index by one until the MPM list is filled up. As a result, the MPM list becomes {planar, HOR, HOR−2, HOR+2, 64, 65}.

Figure 15:
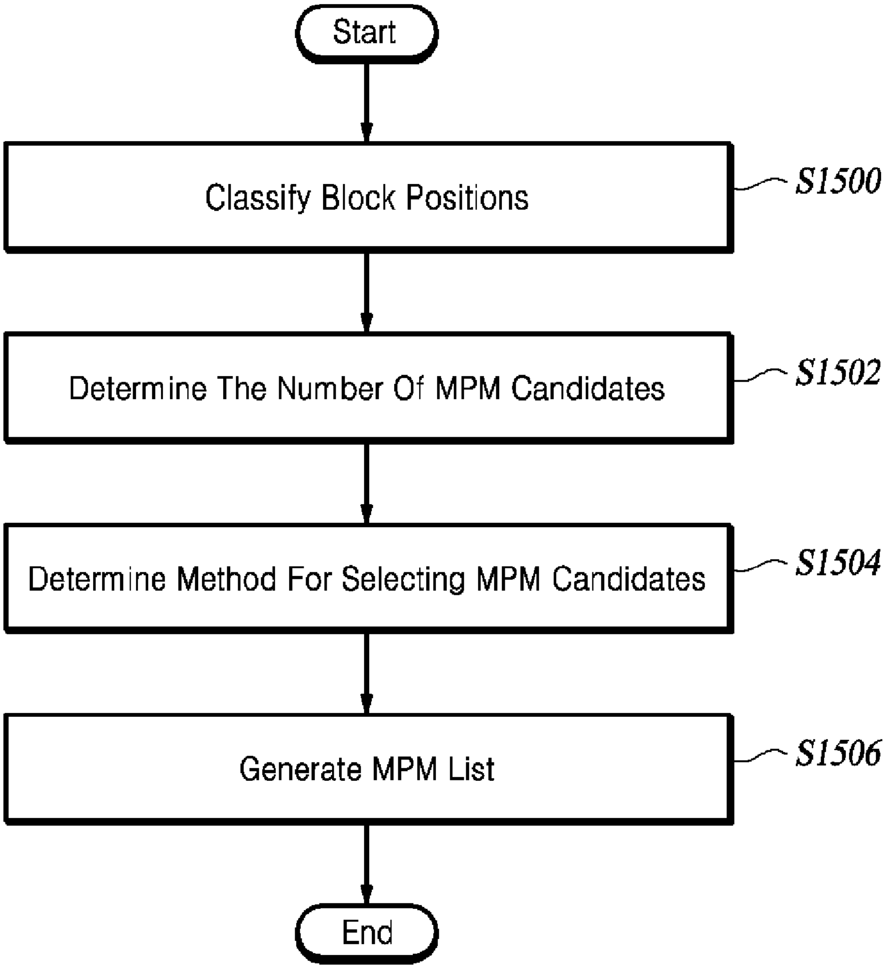
FIG. 15 is a flowchart of a method of composing an MPM list according to a predefined method, according to at least one embodiment of the present disclosure.

FIG. 15 is a flowchart of a method of composing an MPM list according to a predefined method, according to at least one embodiment of the present disclosure.

The video decoding device classifies the current block based on the position of the block (S1500). The video decoding device determines the number of MPM candidates according to the type of block (S1502), and the video decoding device determines a method of selecting the MPM candidates according to the type of block (S1504). The video decoding device composes the MPM list according to the determined method (S1506).

Thereafter, the video decoding device may decode the MPM index from the bitstream and determine the intra-prediction mode of the current block from the MPM list, by using the MPM index.

The method of composing the MPM list according to the example of FIG. 15 may be similarly performed by the video encoding device.

<Implementation 2-2> Removing Redundant Prediction Mode from Existing MPM List Composing Method In this implementation, the video decoding device selects the MPM candidates according to the existing method and removes the remaining redundant prediction modes except the representative mode of one of the selected MPM candidates. The representative mode may be the redundant prediction mode that has the smallest or largest angle (prediction direction), the redundant prediction mode that has the smallest or largest prediction mode index, the redundant prediction mode that has the smallest or largest MPM index, or the prediction mode that was used by the previous blocks and used the most. Alternatively, the representative mode may be a preset prediction mode according to an agreement between the video encoding device and the video decoding device. Furthermore, the range of redundant prediction modes may be determined differently depending on the type of the current block, whether PDPC is applied, and the like. In a conventional VVC configuration, the use of the PDPC technique is not separately signaled at the CU level but is determined by the prediction mode and the size of the block.

Hereinafter, PDPC applicable/non-applicable indicates that the PDPC technique is enabled/disabled at a higher level such as SPS, PPS, and the like. and PDPC available/unavailable indicates whether PDPC is used in the current block when the PDPC technique is enabled.

<Implementation 2-2-1> when PDPC is not Applied, Determining the Range of Redundant Prediction Modes When PDPC is not applied, the range of redundant prediction modes is determined differently depending on the type of the current block. The range of redundant prediction modes when the current block is classified into types 1 to 4 according to the current block classification method based on block position, illustrated in FIG. 11, may be described as follows.

For a type-1 block, all reference pixels are unavailable, so all reference pixels are padded with the same value and the padded reference pixels are generated. Therefore, since all intra-prediction modes generate the same predictor, the redundant prediction modes for the type-1 block are all intra-prediction modes.

For a type-2 block, all left reference pixels are unavailable, so those reference pixels are padded with the same value, and the padded reference pixels are generated. Therefore, the intra-prediction modes that use the left reference pixels (all prediction modes of the horizontal prediction mode and below (mode 18 and below)) all generate the same predictor, so the redundant prediction modes for the type-2 block are all prediction modes of the horizontal prediction mode and below (mode 18 and below).

For a type-3 block, all top reference pixels are unavailable, so those reference pixels are padded with the same value, and the padded reference pixels are generated. Therefore, the intra-prediction modes that use the top reference pixels (all prediction modes of the vertical prediction mode or higher (mode 50 or higher)) generate the same predictor, so the redundant prediction modes for the type-3 block are all prediction modes in vertical prediction mode or higher (mode 50 or higher).

For a type-4 block, different prediction modes generate different predictors because all reference pixels in the block are available. Therefore, there is no range of redundant prediction modes for the type-4 block.

Figure 16:
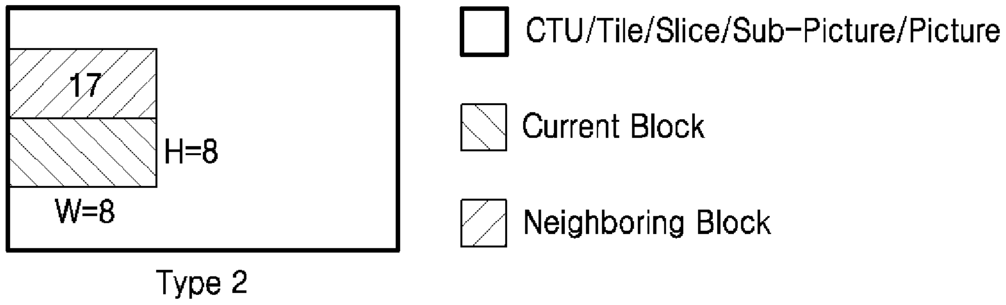
FIG. 16 is a diagram illustrating removal of a redundant prediction mode, according to at least one embodiment of the present disclosure.

When PDPC is not applied, an example application of this implementation is as follows. The following is the case where the current block is of type 2 and the top block uses mode 17, as shown in the example of FIG. 16. Here, the value inside the block indicates the prediction mode of that block. If the MPM list is composed according to the existing VVC method, the MPM list is {planar, 17, 16, 18, 15, 19}. However, with this implementation, prediction modes numbered 18 and below become the range of redundant prediction modes. If mode 18, which is the prediction mode with the largest prediction mode index among the MPM candidates included in the redundant prediction mode range, is set as the representative mode, the MPM list may be organized as {planar, 18, 19} by removing modes 15, 16, and 17.

<Implementation 2-2-2> when PDPC is Applied, Determining the Redundant Prediction Mode Range When PDPC is applied, the range of redundant prediction modes depends on the size (width and height of the block) and the type of the current block. Depending on the size of the block, PDPC may be unavailable because the secondary reference pixels used by PDPC do not exist. Therefore, the range of redundant prediction modes may vary depending on the type of current block and the size of the block that determines PDPC availability. The PDPC-unavailable prediction mode depending on the block size is shown in Table 6.

In the case of PDPC-available prediction mode, even if the values of the reference pixels in the direction pointed by different prediction modes are all the same if the neighboring reference pixels in the opposite direction of each prediction mode have different values, different predictors are generated according to the weighted combination of the reference pixels. Therefore, when PDPC is applied, redundant prediction modes are not generated for PDPC-available prediction modes. However, for PDPC-unavailable prediction modes, redundant prediction modes are generated if the predictor is generated by using only padded reference pixels.

When the current block is classified into types 1 to 4 according to a classification method based on block position, as illustrated in FIG. 11, the redundant prediction mode may be described as follows.

In case of a type-1 block, all reference pixels are unavailable, so all reference pixels are padded with the same value and the padded reference pixels are generated. Therefore, all intra-prediction modes become redundant prediction modes regardless of the availability of the PDPC.

For a type-2 block, the PDPC-unavailable prediction modes are determined from the prediction modes of the horizontal prediction mode (mode 18) and below to be the redundant prediction modes by taking into account the width of the block.

For a type-3 block, the PDPC-unavailable prediction modes are determined from the prediction modes of the vertical prediction mode (mode 50) or above to be the redundant prediction modes by taking into account the height of the block.

For a type-4 block, different prediction modes may generate different predictors regardless of PDPC applicability. Therefore, there is no range of redundant prediction modes.

When PDPC is applied, an example application of this implementation is as follows. As with the example of FIG. 16, described is a case of the current block with (W, H)=(8, 4) having type 2 and the top block using mode 17. If the MPM list is composed according to the existing VVC method, the MPM list is composed of {planar, 17, 16, 18, 15, 19}. However, with this implementation, since (W, H)=(8, 4) in the current block, modes 5 through 17, 19 through 49, and 51 through 69 become PDPC-unavailable ranges, and the redundant prediction mode range becomes 5 through 17. If mode 17, which has the smallest MPM index among the MPM candidates in the redundant prediction mode range, is set as the representative mode, the MPM list may be composed as {planar, 17, 18, 19} by removing modes 15 and 16.

Figure 17:
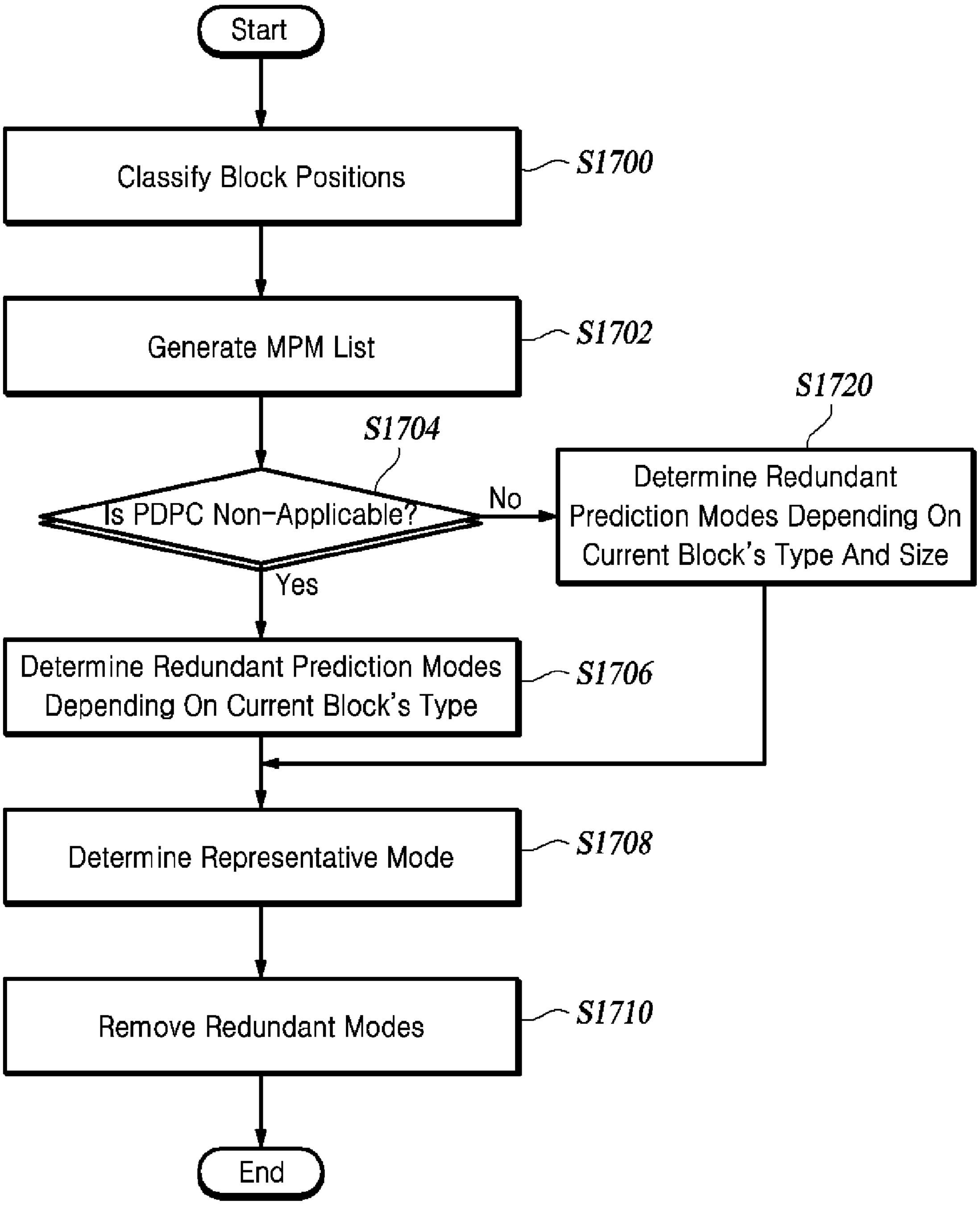
FIG. 17 is a flowchart of a method of removing a redundant prediction mode, according to at least one embodiment of the present disclosure.

FIG. 17 is a flowchart of a method of removing a redundant prediction mode, according to at least one embodiment of the present disclosure.

The video decoding device classifies the current block based on the position of the block (S1700). The video decoding device composes an MPM list according to the same method as in conventional techniques (S1702), and then checks for PDPC non-applicability (S1704). When PDPC is not applied (Yes in S1704), the video decoding device determines redundant prediction modes among the MPM candidates based on the type of the current block (S1706), and when PDPC is applied (Yes in S1704), the video decoding device determines redundant prediction modes among the MPM candidates based on the type and size of the current block (S1720). The video decoding device determines a representative mode among the redundant prediction modes (S1708) and removes the redundant prediction modes except the representative mode (S1710).

Thereafter, the video decoding device may decode the MPM index from the bitstream and may determine the intra-prediction mode of the current block from the reorganized MPM list, by using the MPM index.

The video decoding device may further include decoding a flag indicating whether the MPM list is enabled or disabled. Upon checking the decoded flag and determining that the decoded flag is true, the video decoding device may perform the method of removing the redundant prediction mode according to the example of FIG. 17.

The method of removing the redundant prediction mode according to the example of FIG. 17 may be similarly performed by the video encoding device.

<Implementation 2-3> Removing Redundant Prediction Mode in the Existing MPM List Composing Method and Adding Candidates with a New Method In this implementation, the video decoding device reorganizes the MPM list by removing redundant prediction modes among the MPM candidates selected according to the existing method and adding N (N≥1) new non-redundant prediction modes. At this time, the redundant prediction mode may be removed according to the same method as Implementation 2-2, and the N non-redundant prediction modes may be added according to the method of Implementation 2-1. N denotes the number of non-redundant prediction modes that are added so that the number of candidates is $n_{type}$ which is the number of MPM candidates per type of the current block. The $n_{type}$ may be all the same, some different, or all different depending on the type of the current block.

For example, when PDPC is not applied, the MPM list is {planar, DC, VER, HOR, VER−4, VER+4} for the type-3 current block illustrated in FIG. 14 if the MPM list is composed according to the conventional method of the VVC. However, with this implementation, the range of redundant prediction modes is number 50 (VER) and above. Of VER and VER+4, which are MPM candidates included in the redundant prediction mode range, VER may be set as the representative mode for having a lower prediction mode index, which removes VER+4. If a new MPM candidate is then added by using a method that utilizes a neighboring mode of the non-redundant horizontal prediction mode such that $n_2$=6, the MPM list may be composed of {planar, DC, VER, HOR, VER−4, HOR−4}.

Figure 18:
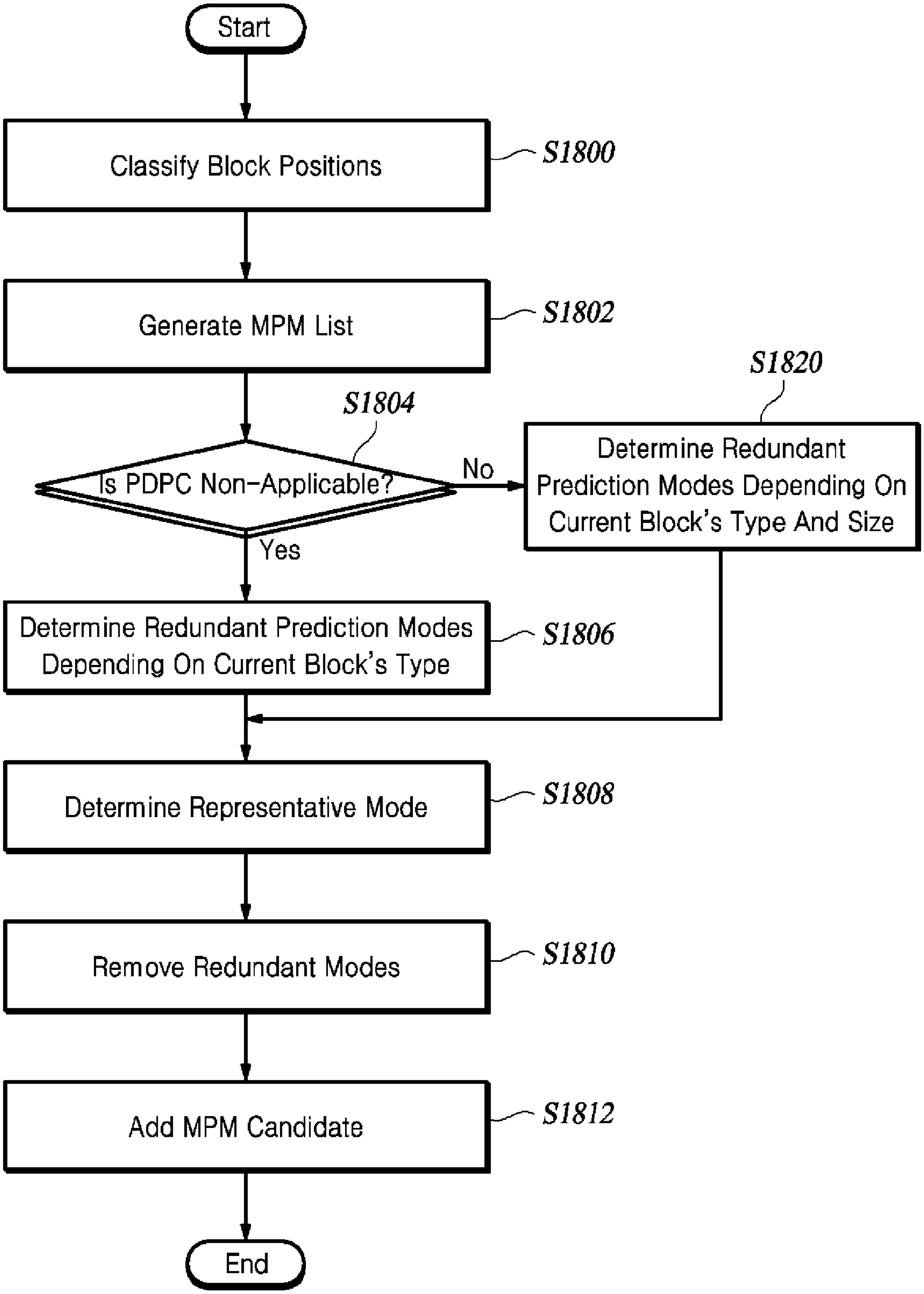
FIG. 18 is a flowchart of a method of removing a redundant prediction mode and adding a new candidate, according to at least one embodiment of the present disclosure.

FIG. 18 is a flowchart of a method of removing a redundant prediction mode and adding a new candidate, according to at least one embodiment of the present disclosure.

The video decoding device classifies the current block based on the position of the block (S1800). The video decoding device composes an MPM list according to the same method as in conventional techniques (S1802), and then checks for PDPC non-applicability (S1804). When PDPC is not applied (Yes in S1804), the video decoding device determines the redundant prediction modes based on the type of the current block (S1806), and when PDPC is applied (No in S1804), the video decoding device determines the redundant prediction modes based on the type and size of the current block (S1820). The video decoding device determines a representative mode among the redundant prediction modes (S1808) and removes the redundant prediction modes except for the representative mode (S1810). The video decoding device adds MPM candidates by using the non-redundant prediction modes based on the type of block (S1812).

The video decoding device may then decode the MPM index from the bitstream and may use the MPM index to determine the intra-prediction mode of the current block from the reorganized MPM list.

The video decoding device may further include the step of decoding a flag indicating whether the MPM list is enabled or disabled. Upon checking the decoded flag and determining that the decoded flag is true, the video decoding device may perform the method of removing the redundant prediction mode and adding a new candidate according to the example of FIG. 18.

The method of removing the redundant prediction mode and adding a new candidate according to the example of FIG. 18 may be similarly performed by the video encoding device.

<Implementation 3> Changing MPM Remainder Candidates Based on Block Position

In this implementation, if the prediction mode of the current block is decoded as an MPM remainder, the video decoding device removes redundant prediction modes among the MPM remainder candidates and decodes the MPM remainder by using only one representative mode. This is the case if the prediction mode of the current block is not included in the MPM list. Similar to Implementation 2-2, the representative mode may be the redundant prediction mode that has the smallest or largest angle, the smallest or largest prediction mode index, etc., or the prediction mode that was used by previous blocks and used the most.

When truncated binary (TB) binarization is used, which is the same method applied to conventional VVC, to encode the modified MPM remainder according to this implementation, the variable of cMax used in TB binarization may be changed and used as shown in Equation 10.

$$cMax=mpm\_remainder\_candidate\_num-1 \quad \text{[Equation 10]}$$

Here, mpm_remainder_candidate_num indicates the number of MPM remainder candidates after removing redundant prediction modes other than the representative mode. The range of redundant prediction modes varies depending on the type of current block and PDPC applicability, and the same method of determining redundant prediction modes as Implementation 2-2 may be used.

For example, if mpm_remainder_candidate_num is 45, the MPM remainder may be encoded as follows. According to this implementation, if mpm_remainder_candidate_num is used to represent a conventional VVC method, then mpm_remainder_candidate_num=61 since cMax=60. Furthermore, if the symbolVal is set for the MPM remainder candidates, excluding the MPM candidates, in decreasing order from 0, a bin string may be generated as shown in Table 3, as described in the prior art. Namely, 3 symbolVals representing 0 to 2 use a 5-bit bin string, and 58 symbolVals representing 3 to 60 use a 6-bit bin string.

However, if redundant prediction modes are removed so that mpm_remainder_candidate_num=45 (cMax=44), the bin string of the MPM remainder may be represented as shown in Table 7. Namely, based on Equation 9, the 19 symbolValues representing 0 to 18 use a 5-bit bin string, and the 26 symbolValues representing 19 to 44 use a 6-bit bin string. This reduces the average length of the bin required to encode the MPM remainder, enabling effective syntax encoding/decoding compared to the conventional method.

TABLE 7

| symbolVal | Standard Binary | Truncated Binary (VVC) |
|---|---|---|
| 0 | 000000 | 00000 |
| 1 | 000001 | 00001 |
| . . . | | |
| 17 | 010001 | 10001 |
| 18 | 010010 | 10010 |
| 19 | 010011 | 100011 |
| 20 | 010100 | 100100 |
| . | . | . |
| . | . | . |
| . | . | . |
| 44 | 101100 | 111111 |

Figure 19:
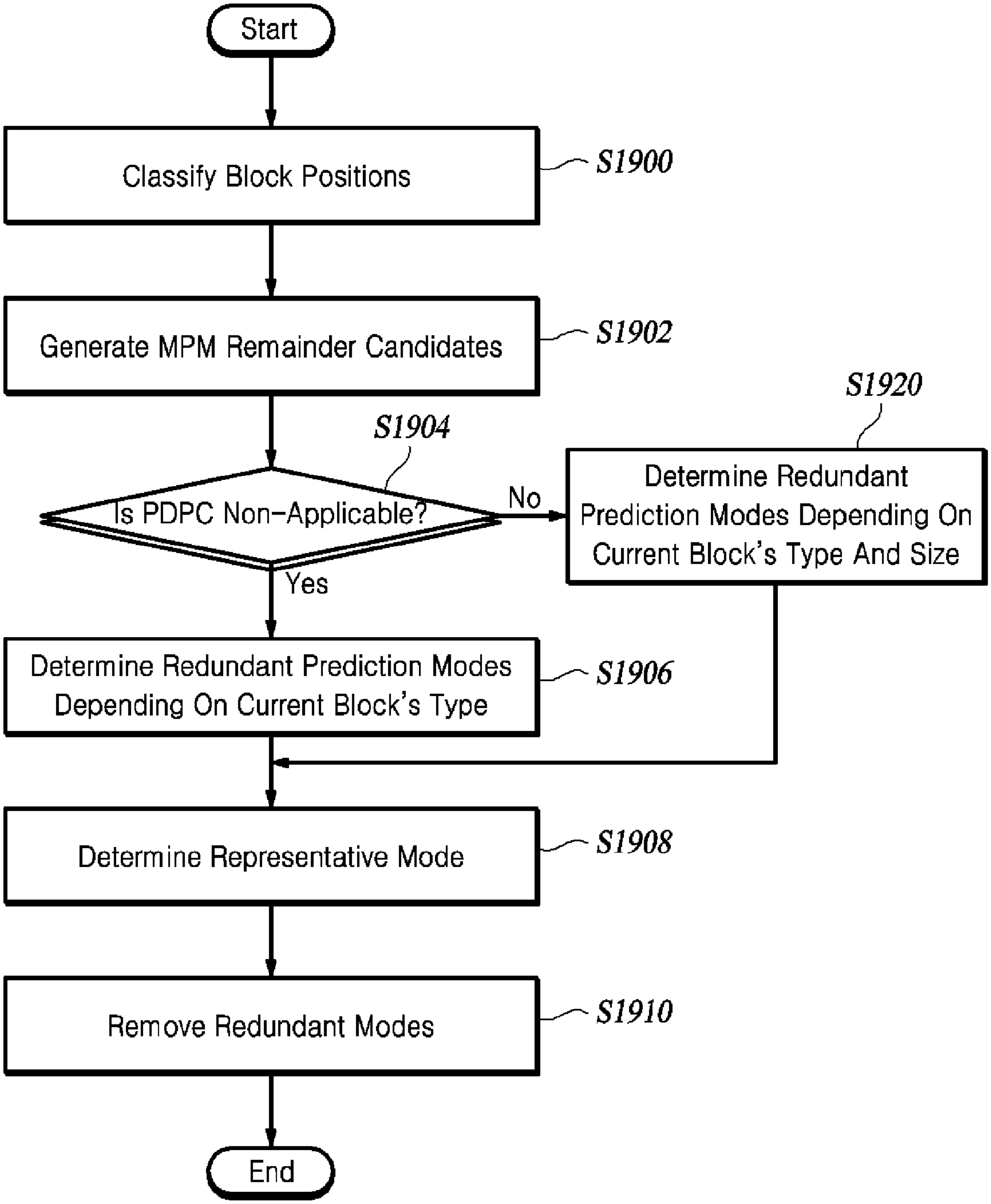
FIG. 19 is a flowchart of a method of removing a redundant prediction mode, according to another embodiment of the present disclosure.

FIG. 19 is a flowchart of a method of removing a redundant prediction mode, according to another embodiment of the present disclosure.

The video decoding device classifies the current block based on the position of the block (S1900). The video decoding device organizes the MPM remainder candidates according to the same method as in conventional techniques (S1902), and then checks for PDPC non-applicability (S1904). When PDPC is not applied (Yes in S1904), the video decoding device determines redundant prediction modes among the MPM remainder candidates based on the type of the current block (S1906), and when PDPC is applied (No in S1904), the video decoding device determines redundant prediction modes among the MPM remainder candidates based on the type and size of the current block (S1920). The video decoding device determines a representative mode among the redundant prediction modes (S1908) and removes the redundant prediction modes except the representative mode (S1910).

Thereafter, the video decoding device may decode the remainder index from the bitstream and determine the intra-prediction mode of the current block from the reorganized remainder candidates by using the remainder index.

The video decoding device may further include decoding a flag indicating whether the MPM list is enabled or disabled. Upon checking the decoded flag and determining the decoded flag is false, the video decoding device may perform the method of removing the redundant prediction mode according to the example of FIG. 19.

The method of removing the redundant prediction mode according to the example of FIG. 19 may be similarly performed by the video encoding device.

<Implementation 4> Changing the Encoding/Decoding Process of an Arbitrary Intra-Prediction Mode Based on Block Position In this implementation, the encoding/decoding method of prediction modes is adaptively changed when an arbitrary intra-prediction mode decoding method is used. In other words, when intra-prediction modes of the current block is transmitted, even with an arbitrary method used rather than using MPM and MPM remainder, searching and encoding/decoding of redundant prediction modes will be inefficient based on the block position. Thus, this implementation avoids such inefficiencies.

For example, when one prediction mode is selected out of a plurality of prediction modes as the prediction mode of the current block and encoding/decoding the prediction mode by using an arbitrary intra-prediction mode encoding/decoding method, the selection of redundant prediction modes may be restricted to avoid using redundant prediction modes except one representative mode, and one of the other prediction modes may be selected.

<Implementation 5> Selectively Using a Combination of Existing Technologies with Implementations 1 Through 4

In this implementation, the video encoding device signals an additional syntax to selectively apply a combination of the methods of Implementations 1 to 4, depending on the implementation. To this end, information about the intra-prediction mode encoding/decoding method for the current block may be signaled by sending a block_position_adaptive_flag, which is a flag indicating whether this implementation is enabled or disabled.

For example, as shown in Table 8, if block_position_adaptive_flag is 0, conventional techniques are used without following the present disclosure, and if block_position_adaptive_flag is 1, Implementation 2 may be applied.

TABLE 8

| | | |
|---|---|---|
| block_position_adaptive_flag | 0 | Use existing technology |
| | 1 | Encode/Decode intra prediction mode according to method of Implementation 2 |

Alternatively, if the block_position_adaptive_flag is 1, as shown in Table 9, an additional block_position_adaptive_idx, an index indicating one of the combinations of this implementation, may be signaled. Namely, a combination of Implementations 1 through 4 may be selected and used depending on the value of block_position_adaptive_idx.

TABLE 9

| | | | | |
|---|---|---|---|---|
| block_position_adaptive_flag | 0 | | | Use existing technology |
| | 1 | block_position_adaptive_idx | 0 | Encode/Decode intra prediction mode according to method of Implementation 1 |
| | | | 1 | Encode/Decode intra prediction mode according to method of Implementation 2 |
| | | | 2 | Encode/Decode intra prediction mode according to method of Implementation 3 |
| | | | 3 | Encode/Decode intra prediction mode according to method of Implementation 2-1 & 3 |
| | | | . | . |
| | | | . | . |
| | | | . | . |

Although the steps in the respective flowcharts are described to be sequentially performed, the steps merely instantiate the technical idea of some embodiments of the present disclosure. Therefore, a person having ordinary skill in the art to which this disclosure pertains could perform the steps by changing the sequences described in the respective drawings or by performing two or more of the steps in parallel. Hence, the steps in the respective flowcharts are not limited to the illustrated chronological sequences.

It should be understood that the above description presents illustrative embodiments that may be implemented in various other manners. The functions described in some embodiments may be realized by hardware, software, firmware, and/or their combination. It should also be understood that the functional components described in the present disclosure are labeled by " . . . unit" to strongly emphasize the possibility of their independent realization.

Meanwhile, various methods or functions described in some embodiments may be implemented as instructions stored in a non-transitory recording medium that can be read and executed by one or more processors. The non-transitory recording medium may include, for example, various types of recording devices in which data is stored in a form readable by a computer system. For example, the non-transitory recording medium may include storage media, such as erasable programmable read-only memory (EPROM), flash drive, optical drive, magnetic hard drive, and solid state drive (SSD) among others.

Although embodiments of the present disclosure have been described for illustrative purposes, those having ordinary skill in the art to which this disclosure pertains should appreciate that various modifications, additions, and substitutions are possible, without departing from the idea and scope of the present disclosure. Therefore, embodiments of the present disclosure have been described for the sake of brevity and clarity. The scope of the technical idea of the embodiments of the present disclosure is not limited by the illustrations. Accordingly, those having ordinary skill in the art to which the present disclosure pertains should understand that the scope of the present disclosure should not be limited by the above explicitly described embodiments but by the claims and equivalents thereof.

REFERENCE NUMERALS

122: intra predictor

155: entropy encoder

510: entropy decoder

542: intra predictor

The invention claimed is:

1. A method performed by a video decoding device for decoding an intra-prediction mode of a current block, the method comprising:

determining a type of the current block based on a position of the current block;

decoding a flag indicating whether a most probable mode list (MPM list) including most probable mode candidates (MPM candidates) is used;

in response to the flag indicating that the MPM list is used:

generating the MPM list;

determining, among the MPM candidates and based on the type of the current block, redundant prediction modes that are intra prediction modes distinct from each other but generate a common predictor for the current block;

determining a representative mode among the redundant prediction modes; and reorganizing the MPM list by removing redundant prediction modes other than the representative mode; and in response to the flag indicating that the MPM list is not used:

organizing remainder candidates;

determining, among the remainder candidates and based on the type of the current block, redundant prediction modes that generate a common predictor;

determining a representative mode among the redundant prediction modes; and reorganizing the remainder candidates by removing redundant prediction modes other than the representative mode.

2. The method of claim 1, further comprising:

decoding from a bitstream a most probable mode index (MPM index) of the current block; and determining from a reorganized MPM list an intra-prediction mode of the current block by using the MPM index.

3. The method of claim 1, further comprising:

adding a new MPM candidate to a reorganized MPM list by using non-redundant prediction modes based on the type of the current block.

4. The method of claim 1, further comprising:

decoding from a bitstream a remainder index of the current block; and determining from reorganized remainder candidates an intra-prediction mode of the current block by using the remainder index.

5. The method of claim 1, wherein determining the redundant prediction modes comprises:

when a position-dependent prediction combination (PDPC) is not applied, determining the redundant prediction modes based on the type of the current block, and when the PDPC is applied, determining the redundant prediction modes based on the type and a size of the current block.

6. The method of claim 2, wherein the representative mode comprises:

one or more of the redundant prediction modes including a prediction mode having an angle or prediction mode index that is smallest or largest, a prediction mode having the MPM index that is smallest or largest, a most used prediction mode among prediction modes used by previous blocks, or a preset prediction mode.

7. The method of claim 1, wherein the type of the current block is classified as Type 1, Type 2, Type 3, and Type 4 based on the position of the current block in a current image that is a coding tree unit (CTU), a tile, a slice, a sub-picture, or a picture.

8. The method of claim 7, wherein the type 1 of the current block represents the current block being located at a top-left corner of the current image, the type 2 of the current block represents the type 1 being excluded and the current block being located at a left boundary of the current image, the type 3 of the current block represents the type 1 being excluded and the current block being located at a top boundary of the current image, and the type 4 represents other types of the current block excluding the type 1, the type 2, and the type 3.

9. The method of claim 7, wherein determining the redundant prediction modes comprises:

determining all prediction modes equal to or below a horizontal prediction mode, as the redundant prediction modes when the PDPC is not applied and the current block is of the type 2, and determining all prediction modes equal to or above a vertical prediction mode, as the redundant prediction modes when the PDPC is not applied and the current block is of the type 3.

10. The method of claim 7, wherein determining the redundant prediction modes comprises:

determining prediction modes that are equal to or below a horizontal prediction mode and are incapable of using the PDPC, as the redundant prediction modes when the PDPC is applied and the current block is of the type 2, and determining prediction modes that are equal to or above a vertical prediction mode and are incapable of using the PDPC, as the redundant prediction modes when the PDPC is applied and the current block is of the type 3.

11. The method of claim 7, wherein determining the redundant prediction modes comprises:

determining all intra-prediction modes to be the redundant prediction modes regardless of whether the PDPC is applied or not and when the current block is of the type 1, and stopping from determining redundant prediction modes regardless of whether the PDPC is applied or not and when the current block is of the type 4.

12. A method performed by a video encoding device for encoding an intra-prediction mode of a current block, the method comprising:

determining a type of the current block based on a position of the current block;

determining whether a most probable mode list (MPM list) including most probable mode candidates (MPM candidates) is used;

in response to determining that the MPM list is used:

generating the MPM list;

determining, among the MPM candidates and based on the type of the current block, redundant prediction modes that are intra prediction modes distinct from each other but generate a common predictor for the current block;

determining a representative mode among the redundant prediction modes; and reorganizing the MPM list by removing redundant prediction modes other than the representative mode, and in response to determining that the MPM list is not used:

organizing remainder candidates;

determining, among the remainder candidates and based on the type of the current block, redundant prediction modes that are intra prediction modes distinct from each other but generate a common predictor for the current block;

determining a representative mode among the redundant prediction modes; and reorganizing the remainder candidates by removing redundant prediction modes other than the representative mode.

13. The method of claim 12, further comprising:

determining an intra-prediction mode of the current block; and determining whether a reorganized MPM list includes the intra-prediction mode of the current block.

14. The method of claim 13, further comprising, when the reorganized MPM list includes the intra-prediction mode of the current block:

determining an MPM index that indicates one of MPM candidates included in the reorganized MPM list;

setting a flag indicating whether the MPM list is to be used to true; and encoding the MPM index and the flag.

15. The method of claim 13, further comprising, when the reorganized MPM list does not include the intra-prediction mode of the current block:

determining a remainder index that indicates one of reorganized remainder candidates;

setting a flag indicating whether the MPM list is to be used to false; and encoding the remainder index and the flag.

16. The method of claim 12, further comprising:

adding a new MPM candidate to a reorganized MPM list by using non-redundant prediction modes based on the type of the current block.

17. A method for providing a video decoding apparatus with video data, the method comprising:

encoding the video data into a bitstream; and transmitting the bitstream to the video decoding device, wherein the encoding of the video data comprises:

determining a type of a current block of the video data based on a position of the current block;

determining whether a most probable mode list (MPM list) including most probable mode candidates (MPM candidates) is used;

in response to determining that the MPM list is used:

generating the MPM list;

determining, among the MPM candidates and based on the type of the current block, redundant prediction modes that are intra prediction modes distinct from each other but generate a common predictor for the current block;

determining a representative mode among the redundant prediction modes; and reorganizing the MPM list by removing redundant prediction modes other than the representative mode, and in response to determining that the MPM list is not used:

organizing remainder candidates;

determining, among the remainder candidates and based on the type of the current block, redundant prediction modes that are intra prediction modes distinct from each other but generate a common predictor for the current block;

determining a representative mode among the redundant prediction modes; and reorganizing the remainder candidates by removing redundant prediction modes other than the representative mode.

* * * * *